(12) United States Patent
Onuma et al.

(10) Patent No.: US 9,113,047 B2
(45) Date of Patent: Aug. 18, 2015

(54) PERIPHERAL MONITORING DEVICE FOR WORKING MACHINE

(75) Inventors: Chieko Onuma, Kasama (JP); Ryo Yumiba, Hitachi (JP); Hidefumi Ishimoto, Toride (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 348 days.

(21) Appl. No.: 13/880,490

(22) PCT Filed: Oct. 22, 2010

(86) PCT No.: PCT/JP2010/068718
§ 371 (c)(1),
(2), (4) Date: May 6, 2013

(87) PCT Pub. No.: WO2012/053105
PCT Pub. Date: Apr. 26, 2012

(65) Prior Publication Data
US 2013/0222573 A1    Aug. 29, 2013

(51) Int. Cl.
*E02F 9/24* (2006.01)
*H04N 7/18* (2006.01)
*E02F 9/26* (2006.01)
*G05B 9/02* (2006.01)
*F04B 49/06* (2006.01)

(52) U.S. Cl.
CPC .. *H04N 7/18* (2013.01); *E02F 9/24* (2013.01); *E02F 9/261* (2013.01); *E02F 9/264* (2013.01); *F04B 49/065* (2013.01); *G05B 9/02* (2013.01)

(58) Field of Classification Search
CPC ............. H04N 7/18; E02F 9/24; E02F 9/261; E02F 9/264; G05B 9/02; F04B 49/065
USPC .................... 340/435, 436; 348/148
See application file for complete search history.

(56) References Cited

U.S. PATENT DOCUMENTS

2010/0220190 A1* 9/2010 Hiroshi .................... 348/148
2010/0259372 A1* 10/2010 Hideshiro .................. 340/435

(Continued)

FOREIGN PATENT DOCUMENTS

| JP | 2008-248613 | 10/2008 |
| JP | 2009-121053 | 6/2009 |
| JP | 2010-198519 | 9/2010 |

OTHER PUBLICATIONS

JP Office Action for Japanese Application No. 2012-539546, issued on May 7, 2014.

*Primary Examiner* — Daniel Wu
(74) *Attorney, Agent, or Firm* — Baker Botts L.L.P.

(57) ABSTRACT

This invention includes: an obstacle detection unit 400 that detects obstacles present around the working machine, by use of an image acquired by a camera 13; a position calculating unit 500 that calculates positions of each of the detected obstacles; a hazard zone calculating unit 700 that calculates a hazard zone based upon an attitude and motion of the working machine; a determining unit 800 that determines whether further obstacles are present in the calculated hazard zone; a risk level setting unit 2000 that sets a contact risk level for each of any obstacles present in the hazard zone; an image generating unit 600 that converts the camera image into a bird's-eye image centering upon the working machine, and then generates an image inclusive of all elements of the working machine and hazard zone on the bird's-eye image by further imaging the bird's-eye image diagonally from above an obstacle for which the highest contact risk level has been set by the risk level setting unit; and a display device 1300 that displays the generated image.

This configuration makes an operator instantly recognize a position of the most potentially hazardous obstacle relative to the working machine, and thus improves working efficiency of the machine.

9 Claims, 25 Drawing Sheets

(56) References Cited

U.S. PATENT DOCUMENTS

2011/0001819 A1\* 1/2011 Asari ............................. 348/113
2011/0157361 A1\* 6/2011 Wu et al. ....................... 348/148
2013/0002877 A1\* 1/2013 Miyoshi et al. ............... 348/148
2013/0088593 A1\* 4/2013 Ishimoto ....................... 348/143

\* cited by examiner

PERIPHERAL MONITORING DEVICE FOR WORKING MACHINE

TECHNICAL FIELD

The present invention relates to a peripheral monitoring device for monitoring obstacles present around a working machine.

BACKGROUND ART

Peripheral monitoring devices for working machines such as hydraulic excavators monitor the periphery of the working machine by means of a camera and/or the like to prevent the machine from coming into contact with any obstacles (persons and objects) present around the machine during work. Techniques relating to devices of this type are intended to allow an operator to easily and readily recognize the relationship in position between the working machine and the obstacles existing around it. Among these techniques is one that achieves its intended purpose by displaying three images in superimposed form on a display device. One depicts an attitude and working zone of the working machine during the work, one is obtained by converting a camera-acquired image of the working machine periphery into a bird's-eye image of the machine as viewed diagonally from above, and one depicts an obstacle appropriately detected by the camera or other means. JP-2008-248613-A, for example, discloses the technique.

PRIOR ART LITERATURE

Patent Documents

Patent Document 1: JP-2008-248613-A

SUMMARY OF THE INVENTION

Problems to be Solved by the Invention

The technique described in the above document is excellent in terms of the fact that the operator can easily and readily recognize the existence of obstacles and the relationship in position between the working machine and one obstacle by viewing the images displayed in superimposed form on the display device. Incidentally, if a plurality of obstacles are displayed around the working machine, a need may arise for the operator to judge with which of the obstacles the machine is most likely to come into contact. If this is the case, the operator himself or herself will have to conduct the judgment and this judging operation will necessarily intervene in normal work (excavation). If it is assumed that the working machine will be used in such a situation, therefore, the above technique admits of improvement for enhanced working efficiency of the working machine.

An object of the present invention is to provide a peripheral monitoring device for working machines, adapted to enable an operator to instantly recognize a position of the most potentially hazardous obstacle with respect to the working machine.

Means for Solving the Problem

In order to attain the above object, an aspect of the present invention includes: imaging means that acquires a peripheral image of the working machine; obstacle detecting means that detects obstacles present around the working machine, by use of the acquired image; position calculating means that calculates positions of each of the detected obstacles relative to the working machine; hazard zone calculating means that calculates a hazard zone around the working machine, based upon at least one of an attitude and motion of the working machine; determining means that determines, by the calculated positions of the obstacles, whether further obstacles are present in the calculated hazard zone; risk level setting means that sets, for any obstacles determined by the determining means to be present in the hazard zone, a contact risk level based upon at least one of the type, position, and height of each obstacle that are obtained from the acquired image; image generating means that first converts the acquired image into a bird's-eye image centering upon the working machine, and then generates an image inclusive of all elements of the working machine and hazard zone on the bird's-eye image by further imaging the bird's-eye image diagonally from above an obstacle for which the highest contact risk level is set by the risk level setting means; and display means that displays the generated image.

Effects of the Invention

The present invention makes the operator instantly recognize the position of the most potentially hazardous obstacle with respect to the working machine, and thus improves working efficiency of the working machine.

MODE FOR CARRYING OUT THE INVENTION

Figure 1:
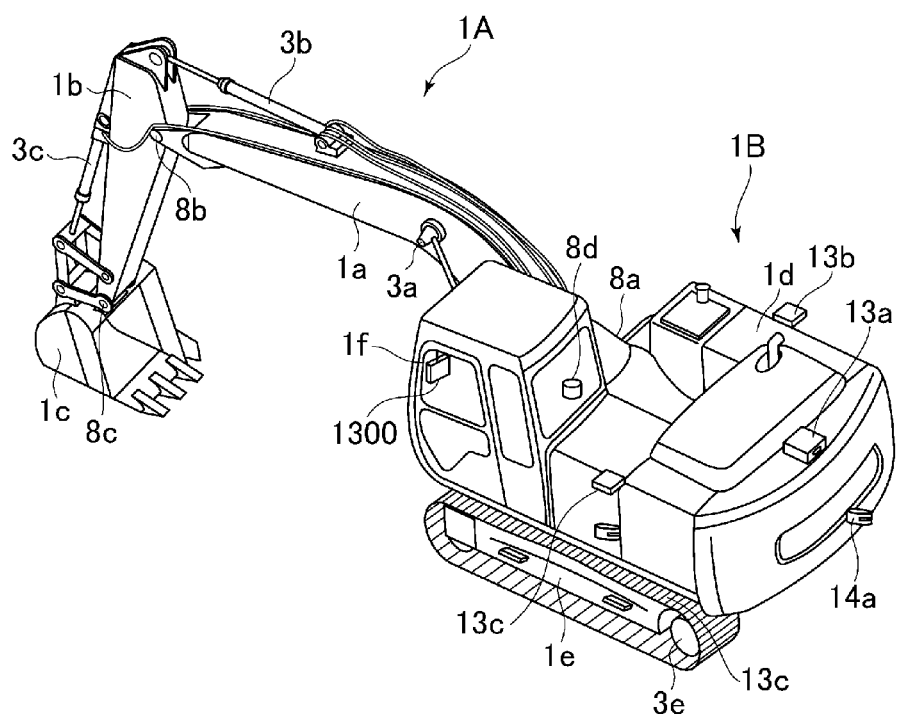
FIG. 1 is an external view of a hydraulic excavator which is an example of a working machine according to an embodiment of the present invention.

An embodiment of the present invention is described below using the accompanying drawings. FIG. 1 is an external view of a hydraulic excavator which is an example of a working machine according to the embodiment of the present invention. The hydraulic excavator shown in the figure has an articulated type of front working implement 1A including a boom 1a, an arm 1b, and a bucket 1c, each constructed to pivot in a perpendicular direction, a vehicle body 1B including an upper structure 1d and a lower structure 1e, and a display device 1300 installed inside a cabin 1f.

The cabin 1f is equipped as part of the upper structure 1d. The boom 1a of the front working implement 1A has a proximal end supported from a front section of the upper structure 1d. The boom 1a, the arm 1b, the bucket 1c, the upper structure 1d, and the lower structure 1e are driven by respective actuators, namely a boom cylinder 3a, an arm cylinder 3b, a bucket cylinder 3c, a swinging motor (not shown), and leftward and rightward traveling motors 3e and 3f (not shown). The boom 1a, the arm 1b, the bucket 1c, and the upper structure 1d are each equipped with an angle detector 8a, 8b, 8c, or 8d that detects a pivoting angle (θ1, θ2, θ3, or θ4) of the movable element.

On the upper structure 1d, a rearview camera 13a, a right-sideview camera 13b, and a left-sideview camera 13c are placed as imaging means to acquire images of a peripheral region of the hydraulic excavator. The rearview camera 13a, for imaging a rear region of the upper structure 1d, is installed at the rear thereof. The right-sideview camera 13b, for imaging a right-side region of the upper structure 1d, is installed on the right side thereof. The left-sideview camera 13c, for imaging a left-side region of the upper structure 1d, is installed on the left side thereof.

Figure 2:
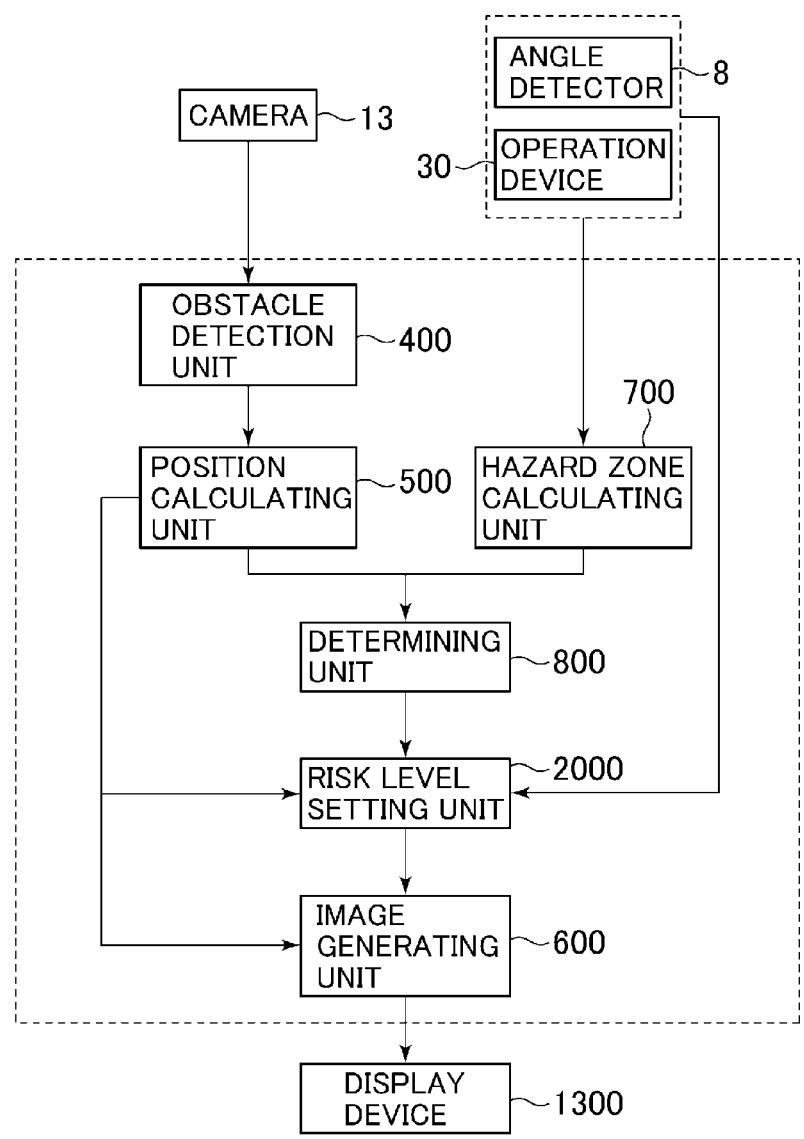
FIG. 2 is an overall configuration diagram of a peripheral monitoring device for the working machine according to the embodiment of the present invention.

FIG. 2 is an overall configuration diagram of a peripheral monitoring device for the working machine according to the embodiment of the present invention. The same elements as in the preceding figure are each assigned the same reference number, and description of these elements is omitted herein (the same also applies to figures that follow). The peripheral monitoring device shown in FIG. 2 includes the cameras 13a, 13b, 13c, an obstacle detection unit 400, a position calculating unit 500, a hazard zone calculating unit 700, a determining unit 800, a risk level setting unit 2000, an image generating unit 600, and the display device 1300. The peripheral monitoring device also includes such a processing unit (not shown) as a CPU for executing processes that each of the units conducts, and such a storage device (not shown) as a memory into which the kinds and details of processes conducted by each unit, and results of the processes are stored.

The obstacle detection unit 400 detects obstacles present around the hydraulic excavator, by using the images that the cameras 13a, 13b, 13c have acquired, and the position calculating unit 500 calculates relative positions of any obstacles detected by the obstacle detection unit 400, with respect to the hydraulic excavator.

The hazard zone calculating unit 700 calculates a hazard zone covering the hydraulic excavator periphery, based upon at least one of an attitude and motion of the hydraulic excavator. The attitude of the hydraulic excavator here (i.e., data including a swing angle of the upper structure 1d and an attitude of the front working implement 1A) is calculated from the detection angles (θ1, θ2, θ3, θ4) that the angle detectors 8a, 8b, 8c, 8d have detected. In addition, data on the motion of the hydraulic excavator is calculated from an operation signal (hydraulic signal or electrical signal) that is output from an operation device (operation lever) 30 installed inside the cabin 1f, to the boom cylinder 3a, the arm cylinder 3b, the bucket cylinder 3c, the swinging motor (not shown), and/or the leftward and rightward traveling motors 3e and 3f. Data on the operation of the hydraulic excavator is also calculated from time-varying changes in the angles (θ1, θ2, θ3, θ4) detected by the angle detectors 8a, 8b, 8c, 8d.

The determining unit 800 determines, from the obstacle position that the position calculating unit 500 has calculated, whether obstacles exist in the hazard zone that the hazard zone calculating unit 700 has calculated. "In the hazard zone" here refers to both an inner region of a hazard zone (i.e., the hydraulic excavator side) and a region on the hazard zone. All other regions of the hazard zone are referred to collectively as the outside of the hazard zone.

The risk level setting unit 2000 sets, for any obstacles determined by the determining unit 800 to be present within the hazard zone, a contact risk level based upon at least one of the type (person/object), position, and height of each obstacle that have been obtained from the images acquired by the cameras 13a, 13b, 13c (hereinafter, the contact risk levels may be referred to simply as risk levels).

The image generating unit 600 first converts the images acquired by the cameras 13a, 13b, 13c, into a bird's-eye image centering upon the hydraulic excavator, and then generates an image as a monitoring image by further imaging the bird's-eye image diagonally from above an obstacle having the highest contact risk level set by the risk level setting unit 2000. The monitoring image generated by the image generating unit 600 includes all elements of both of the hydraulic excavator and the hazard zone calculated by the hazard zone calculating unit 700, on the bird's-eye image.

Figure 3:
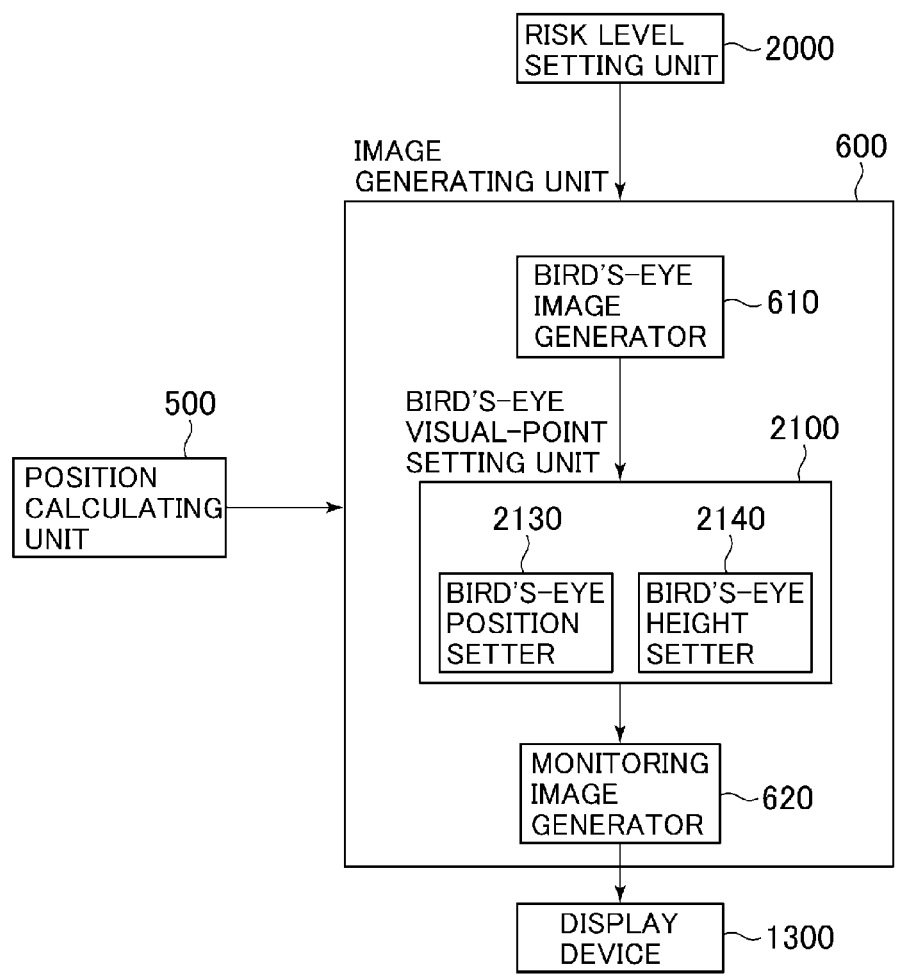
FIG. 3 is a configuration diagram of an image generating unit 600 in the embodiment of the present invention.

FIG. 3 is a configuration diagram of the image generating unit 600 in the embodiment of the present invention. As shown in the figure, the image generating unit 600 includes a bird's-eye image generator 610, a bird's-eye visual-point setting unit 2100, and a monitoring image generator 620.

The bird's-eye image generator 610 converts the images acquired by the cameras 13a, 13b, 13c, into a bird's-eye image centering upon the hydraulic excavator. The bird's-eye image here means an image equivalent to a plan view obtained when a work site centering upon the hydraulic excavator is viewed from a position directly above the hydraulic excavator. In the present embodiment, bird's-eye image generator 610 generates the bird's-eye image by converting and combining the images acquired by the three cameras, namely 13a, 13b, 13c. The conversion of the camera-acquired images into the bird's-eye image can use, for example, a method described later herein or the method described in JP-2006-48451-A.

The bird's-eye visual-point setting unit 2100 sets a visual point (bird's-eye visual point) for looking down upon the bird's-eye image that the bird's-eye image generator 610 has generated, through a virtual camera (not shown). The setting unit 2100 includes a bird's-eye position setter 2130 and a bird's-eye height setter 2140. The bird's-eye position setter 2130 sets a position of the bird's-eye visual point, on a horizontal surface. In the present embodiment, a position of the obstacle, on the horizontal surface, that has the highest contact risk level set by the risk level setting unit 2000, is set as the position of the bird's-eye visual point. The bird's-eye height setter 2140 sets a height (vertical) position of the bird's-eye visual point, and in the present embodiment, bird's-eye height is set so that at least the hydraulic excavator and the hazard zone calculated by the hazard zone calculating unit 700 are included in an image that the virtual camera acquires. Instead of or in combination with controlling bird's-eye height (height of the virtual camera) in this manner, the virtual camera may have its focal length (angle of view) controlled for both of the hydraulic excavator and the hazard zone to be included in the virtual camera image.

The monitoring image generator 620 generates a monitoring image by further imaging, with the virtual camera from the bird's-eye visual point set by the bird's-eye visual-point setting unit 2100, the bird's-eye image generated by the bird's-eye image generator 610. The monitoring image generator 620 also conducts the process of combining and displaying necessary images upon the generated monitoring image as appropriate. For example, the monitoring image preferably is such that a dummy working-machine figure graphically representing the hydraulic excavator centrally in the bird's-eye image will be displayed to enable the operator to readily understand the position of an obstacle relative to the hydraulic excavator. The dummy working-machine figure will be displayed by, for example, displaying an illustration or three-dimensional model of the hydraulic excavator centrally in the bird's-eye image. During this display, an actual attitude and motion of the hydraulic excavator will be preferably incorporated into the dummy working-machine figure to allow the operator to even more readily grasp a particular situation.

In addition, for improved operator's visibility, if the obstacle having the highest contact risk level is a person, a pictorial warning will be preferably displayed in superimposed form on the obstacle. The pictorial warning will be preferably a figure such as a star-shaped figure, or a character string such as "DANGER", and more preferably, this warning display will be provided with conspicuous coloring in the monitoring image. Conversion into the bird's-eye image will lead to the image being scaled up or down as appropriate, making the type of obstacle most likely to be difficult to identify. For this reason, if the obstacle having the highest contact risk level is a person, an image representing a person may be displayed in superimposed form on the obstacle to improve the operator's visibility. The graphic representing a person in this case will be, for example, an illustration or photograph of a person. More preferably, this illustration or photograph will be provided with conspicuous coloring in the monitoring image.

Referring back to FIG. 2, the display device 1300 displays the image generated by the image generating unit 600, and as shown in FIG. 1, the display device 1300 is installed inside the cabin 1f. The display device 1300 is preferably installed at a position convenient for the operator to readily confirm in visual form in the cabin 1f of the hydraulic excavator.

The peripheral monitoring device may include either a display device in addition to a computer capable of processing images, or a display device in addition to a dedicated computer for image processing.

For improved obstacle detection performance of the obstacle detection unit 400, the cameras 13a, 13b, 13c are preferably installed on the upper structure 1d instead of millimeter-wave radars or other distance sensors being mounted thereupon. For example, as shown in FIG. 1, a millimeter-wave radar 14a for measuring a distance from the rear of the upper structure 1d to an obstacle is mounted below the rear-view camera 13a, a millimeter-wave radar 14b for measuring a distance from the right side of the upper structure 1d to another obstacle is mounted below the right-sideview camera 13b, and a millimeter-wave radar 14c for measuring a distance from the left side of the upper structure 1d to yet another obstacle is mounted below the left-sideview camera 13c. The detection performance obtained when the millimeter-wave radars 14 are used to detect obstacles is compared with that obtained when the cameras 13 are used to detect obstacles.

Figure 4:
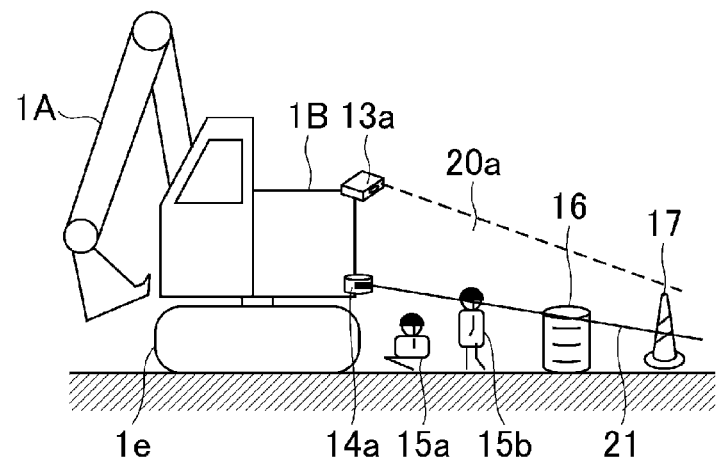
FIG. 4 is an explanatory diagram of detection zones covered when an obstacle detection unit 400 uses a camera 13a as a detector to detect obstacles and when the obstacle detection unit 400 uses a millimeter-wave radar 14a as a detector to detect obstacles.

FIG. 4 is an explanatory diagram of detection zones covered when the obstacle detection unit 400 uses the camera 13a as a detector to detect obstacles and when the obstacle detection unit 400 uses the millimeter-wave radar 14a as a detector to detect obstacles. The millimeter-wave radar 14a has an ability to perform a horizontal scan 21, whereas vertical scanning with the radar 14a is difficult. In this case, since a lower structure 1e of a general hydraulic excavator is at least 1.0 m high above a ground level, the millimeter-wave radar 14a is inevitably mounted at a position of more than 1.0 m high. Accordingly if an obstacle (e.g., a sitting person 15a whose head is about 0.8 m high) is present below or directly under the millimeter-wave radar 14a, the obstacle is outside a line of vision of the millimeter-wave radar 14a and cannot be detected. However, if the camera 13a is installed atop the vehicle body 1B at such an angle of depression that the camera can image an object present below or directly under it, this allows imaging in both horizontal and vertical directions, resulting in even the sitting person 15a becoming imageable and in no such a blind area occurring that the millimeter-wave radar 14a does generate. Using the cameras 13a, 13b, 13c as in the present embodiment, therefore, improves obstacle detection performance and enhances safety as well. It goes without saying that mounting the millimeter-wave radars 14a, 14b, 14c in addition to the cameras 13a, 13b, 13c further improves detection performance.

Figure 5:
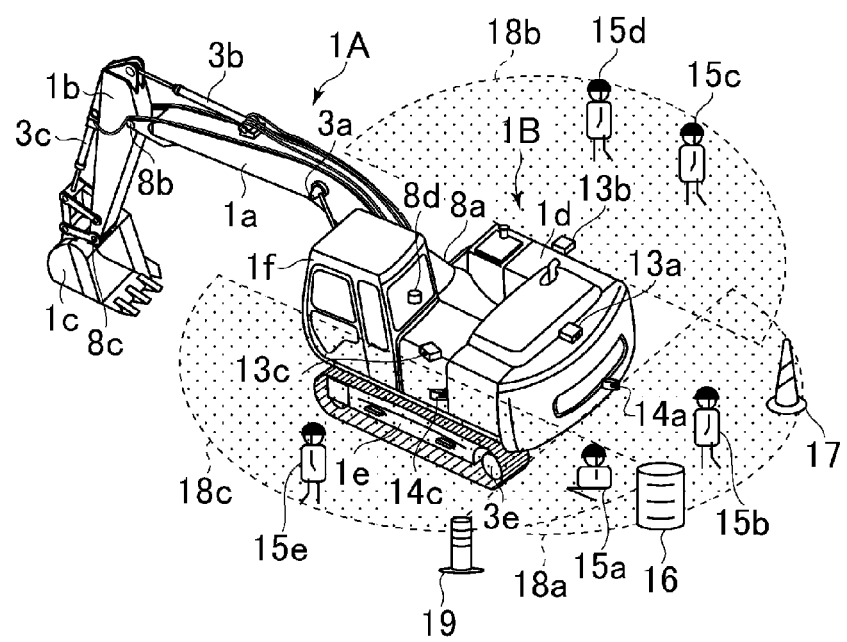
FIG. 5 is an explanatory diagram representing a relationship in position between the hydraulic excavator according to the embodiment of the present invention and obstacles (persons/objects) present around the hydraulic excavator.

The following describes a case in which the peripheral monitoring device of the hydraulic excavator that has the above configuration is operated under an environment shown in FIG. 5. FIG. 5 is an explanatory diagram representing a relationship in position between the hydraulic excavator according to the embodiment of the present invention and obstacles (persons/objects) present around the hydraulic excavator. In this figure, the camera 13a and the millimeter-wave radar 14a are mounted at the rear of the upper structure 1d, the camera 13b and the millimeter-wave radar 14b, at the right side, and the camera 13c and the millimeter-wave radar 14c, at the left side. In addition, persons and objects are present in directions that are low in visibility from the operator, that is, persons 15a, 15b, a sandbag 16, a road cone/pylon 17, and a rubber pole 19 are present at the rear of the upper structure 1d, persons 15c, 15d are present at the right side, and a person 15e is present at the left side.

Figure 6:
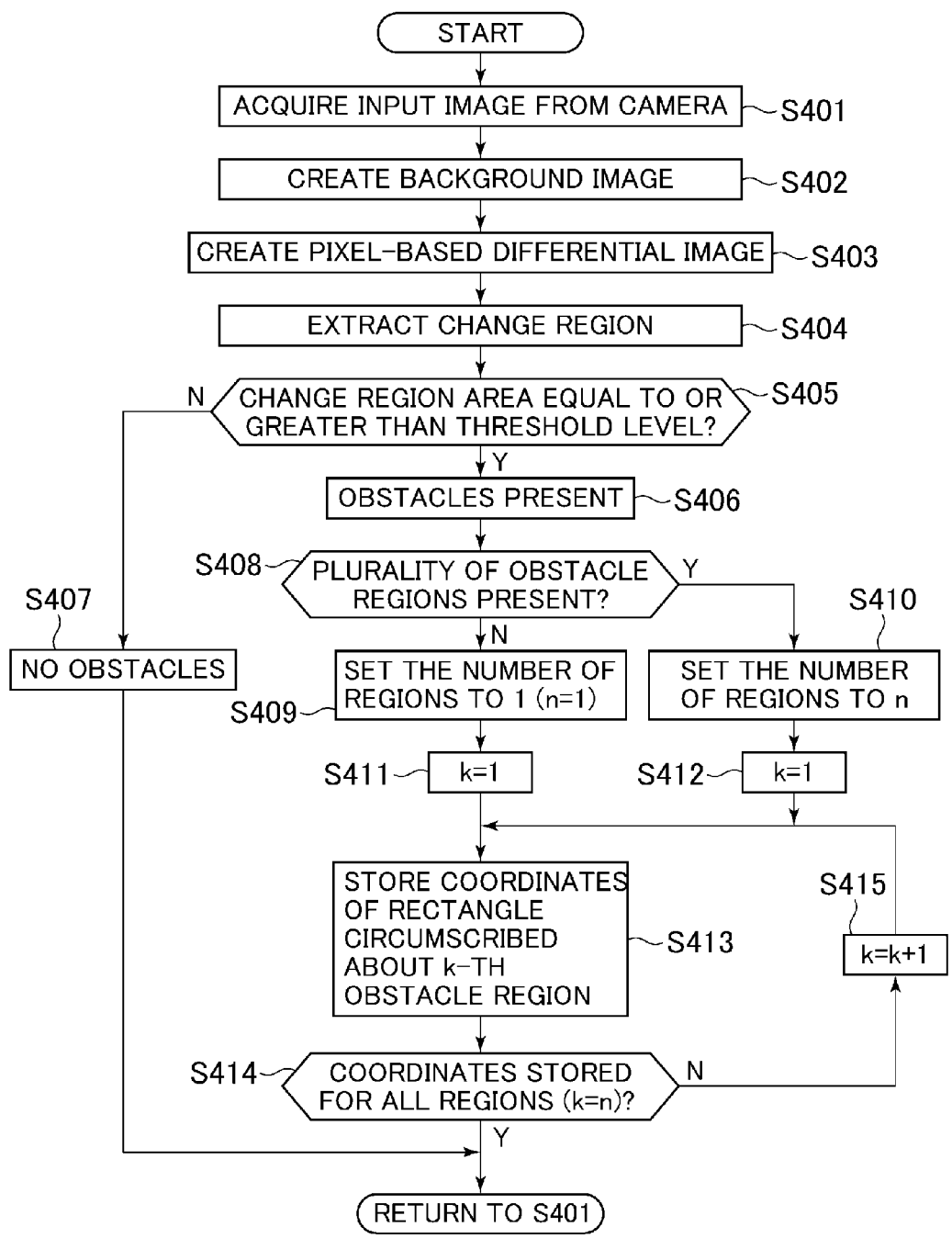
FIG. 6 is a flowchart of a process conducted in the obstacle detection unit 400 in the embodiment of the present invention.

FIG. 6 is a flowchart of the process conducted in the obstacle detection unit 400 in the embodiment of the present invention. Upon a start of peripheral monitoring by the peripheral monitoring device, the obstacle detection unit 400 first incorporates an image that is input from a camera 13 (step S401). Next, the obstacle detection unit 400 receives, as a background image from the camera 13, for example, an input image of an immediately preceding frame or nth frame or an image separately acquired without an obstacle around (step S402). After that, the obstacle detection unit 400 uses the input image in step S401 and the background image in step S402 to create a pixel-based differential image (step S403). The obstacle detection unit 400 next binarizes the created differential image into sections of 0s, which are lower than predetermined threshold levels of about 7 to 15 in brightness, and sections of 1s, which are equal to or greater than the threshold levels in brightness, and extracts a change region relating to the positions of obstacles (step S404).

Next, whether a section that is equal to or greater than a predetermined threshold level in area is present in the change region that was extracted in step S404 is determined (step S405). In consideration of the fact that obstacles more distant from the camera 13 will look smaller in the image, the threshold level used in step S405 is preferably set to decrease with an increase in distance from the camera 13. If the section equal to or greater than the predetermined threshold level in area is determined in step S405 to exist in the change region, this means that an obstacle region has been determined to exist (step S406), in which case, the process proceeds to step S408. If the change region is determined to contain only sections that are lower than the predetermined threshold level, this means that no obstacles have been determined to exist (step S407), in which case, step S401 onward is repeated.

It is checked in step S408 whether other obstacle regions also exist. If the number of obstacle regions is determined in step S408 to be one, "n=1" is set (step S409). Next, "k" is set to be 1 (step S411) and after coordinates of an upper left corner and lower right corner of a rectangle circumscribed about the obstacle region have been stored into the storage device (step S413), step S401 onward is repeated.

Conversely if a plurality of obstacle regions are determined in step S408 to exist, the number of obstacle regions is determined to be "n" (step S410). Next, "k" is set to be 1 (step S412) and after coordinates of an upper left corner and lower right corner of a rectangle circumscribed about the first of the newly detected obstacle regions have been stored into the storage device (step S413), it is checked whether coordinates have been stored for each of the remaining obstacle regions, that is, whether "k" has reached "n" (step S414). If, in step S414, "k" is found not to be up to "n", "k" is incremented by 1 (step S415), then the process is returned to step S413, and steps S413, S414, S415 are further repeated for each of any obstacle regions remaining unprocessed. The obstacles existing around the hydraulic excavator can thus be detected.

Figure 7:
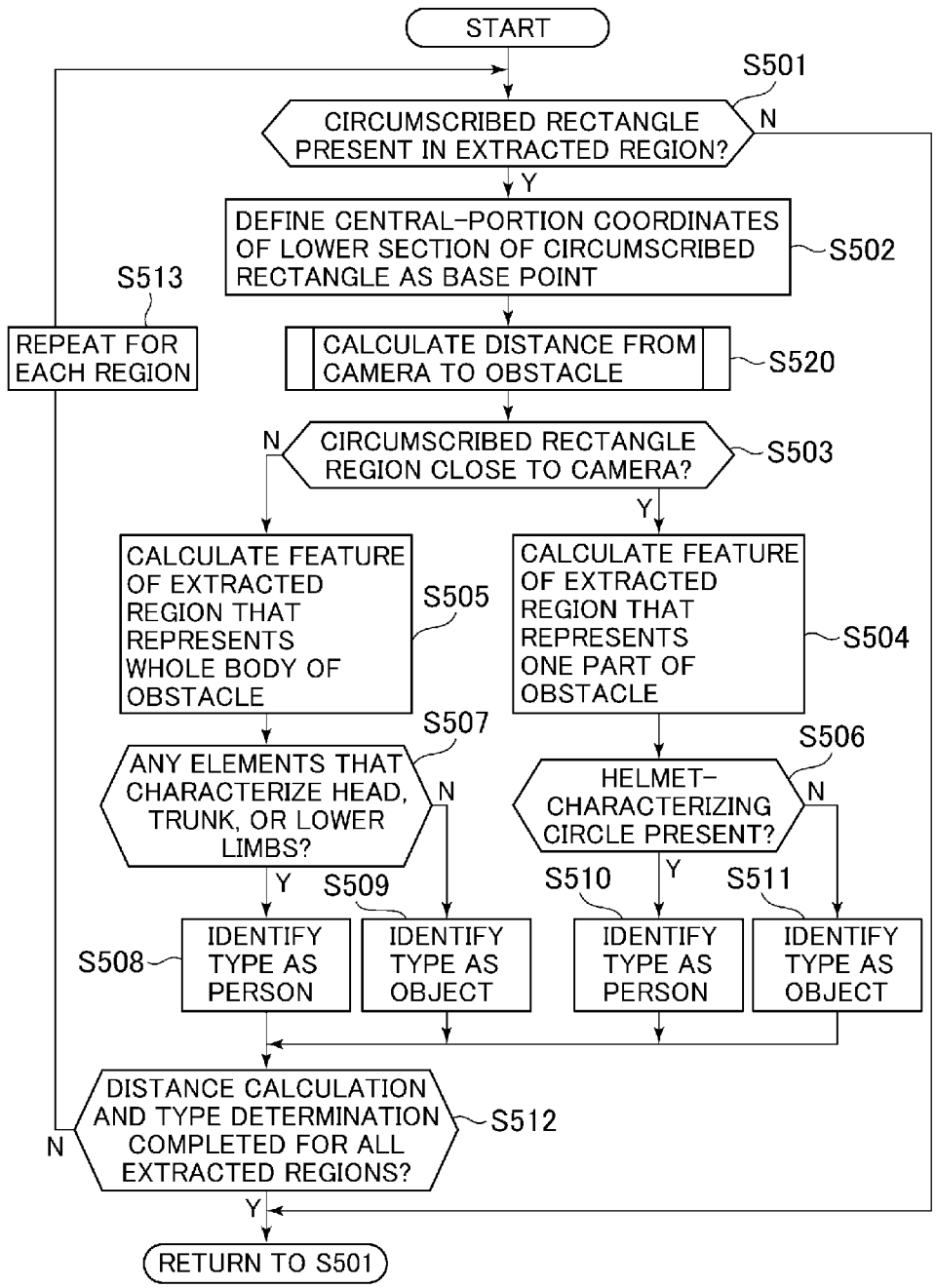
FIG. 7 is a flowchart of a process conducted in a position calculating unit 500 in the embodiment of the present invention.

FIG. 7 is a flowchart of the process conducted in the position calculating unit 500 in the embodiment of the present invention. Upon the start of peripheral monitoring by the peripheral monitoring device, the position calculating unit 500 checks whether a circumscribed rectangle is present in the region that the obstacle detection unit 400 has extracted, that is, whether the circumscribed rectangle has its coordinates stored into the storage device by the obstacle detection unit 400 (step S501).

If the circumscribed rectangle is present in the extracted region in step S501, the process advances to step S502. If the circumscribed rectangle is not present in step S501, checking will be continued until the circumscribed rectangle exists. If the circumscribed rectangle is present in the extracted region, the circumscribed rectangle has coordinates (pixel) of a midpoint of its lower side defined as a base point for position calculation of an obstacle (step S502). In accordance with this definition, a distance from the camera 13 to the obstacle is calculated (step S520).

Figure 8:
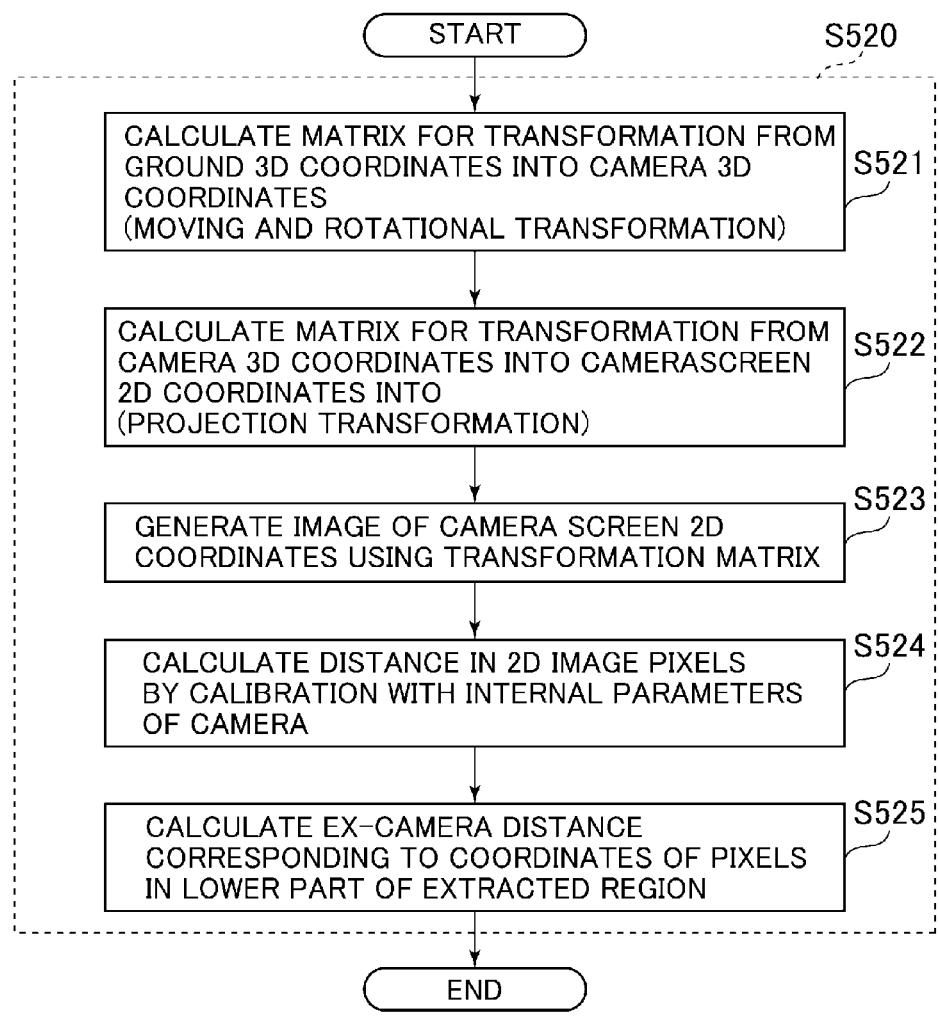
FIG. 8 is a flowchart relating to calculating a distance between an obstacle and a camera 13 in step S520.

FIG. 8 is a flowchart relating to calculating the distance between the obstacle and the camera 13 in step S520.

The following describes the way the distance from the camera (image sensor) is calculated. The pinhole camera model, based upon the principles of this distance calculation, is the most common method used as a model for conducting conversions between an actual ground 3D coordinate system and a coordinate system for camera image-processing screens or other camera screens. This method allows camera 3D coordinates to be calculated by conducting a moving process and a rotational transformation upon ground 3D coordinates, and 2D coordinates of the camera image to be further calculated by conducting a projection transformation upon the calculated camera 3D coordinates. In other words, the camera 3D coordinate system can be obtained by multiplying a combination of the ground 3D coordinates and a position parameter of the camera by a rotation matrix relating to a yaw angle parameter, a depression angle parameter, and rotational angle parameter. Additionally, conducting a projective transformation with the camera 3D coordinate system and a scale parameter yields a camera screen 2D coordinate system. The camera parameters used here are (1) the camera position parameter (the ground 3D coordinates of the camera lens center, that is, visual point), (2) the depression angle parameter, (3) the yaw angle parameter, (4) the rotational angle parameter, and (5) the scale parameter. Of the five parameters, (1) the camera position parameter, (2) the depression angle parameter, and (3) the yaw angle parameter can be calculated from installation specifications data relating to the camera. The fourth parameter, namely the rotational angle parameter, can be calculated inside the transformation since this parameter is subordinate to (2) the depression angle parameter and (3) the yaw angle parameter. The fifth parameter, namely the scale parameter, is subordinate to a zoom ratio. Each camera parameter can therefore be calculated by conducting calibration with an object of a known size after the installation of the camera, and the distance in the camera image can be calculated using the calculated parameters.

Based upon the above principles, transformation from a ground 3D coordinate system into a camera screen 2D coordinate system takes place in step S520 to calculate the distance from the camera 13 to the obstacle. The position calculating unit 500 first calculates a camera 3D coordinate transformation matrix from the ground 3D coordinates by conducting a moving process and a rotational transformation (step S521), and then calculates the camera screen 2D coordinate transformation matrix from the camera 3D coordinates by conducting a projection transformation (step S522). Next, the position calculating unit 500 creates an image of camera screen 2D coordinates using the transformation matrix which was created in step S522, and calculates the distance in the pixels of the 2D image by the calibration that uses internal parameters of the camera (step S524). After the calculation, the position calculating unit 500 calculates the distance from the base point (midpoint of the lower side of the obstacle region) set in step S502, to the camera 13, and advances the process to step S503.

Referring back to FIG. 6, it is checked in step S503 whether the circumscribed rectangle is positioned in a region close to the camera 13, that is, whether the distance that was calculated in step S520 is equal to or less than a predetermined threshold value. If the distance calculated in step S520 is equal to or less than the predetermined threshold value, the circumscribed rectangle is determined to be positioned in the region close to the camera 13. In this case, the extracted region is estimated to be part of the obstacle region and features of the obstacle are extracted (step S504). More specifically, it is checked in step S506 whether a circle, a feature of a helmet, is present in the extracted region. If, in step S506, the circle is determined to be present, the extracted region is determined to be a worker (person) who is wearing a helmet (step S510). If the circle is determined to be absent, the extracted region is determined to be an object (step S511).

Conversely if, in step S503, the distance calculated in step S520 is greater than the predetermined threshold value, the extracted region is estimated to be where the obstacle region is imaged in its entirety, and features of the obstacle are extracted (step S505). More specifically, it is determined in step S507 whether the extracted region has an aspect ratio close to that of a standing person or whether, when the extracted region is divided into three sections equivalent to a human head, trunk, and lower limbs, and respective profile shapes, colors, and other elements are extracted, the sections of the extracted region have a feature of the head, trunk, or lower limbs. In other words, it is checked whether height of the extracted region is greater than its width in terms of aspect ratio or whether the head of the extracted region has a fan-shaped profile, a shoulder part of the trunk has a slant profile or the trunk itself has a vertical profile, and/or the lower limbs have an inverse V-profile or a vertical profile. If in step S507 at least one of these features is found to exist in the extracted region, this region is determined to be a person (step S508). If one or none of the features is found to exist, the extracted region is determined to be an object (step S509). After the identification of the type (person/object) of extracted region in steps S508 to S511, it is further checked in step S512 whether distance calculations and type determinations have also been conducted upon all other extracted regions. If the calculations and/or the determinations are not completed, the position calculating unit 500 returns to step S501 and repeats step S501 onward. The relative position of the obstacle detected by the obstacle detection unit 400, with respect to the hydraulic excavator, is calculated by the execution of the above process. Depending upon the determination result in step S503, a method different from the above may be applied in the following type-determination step (S506, S507).

Figure 9:
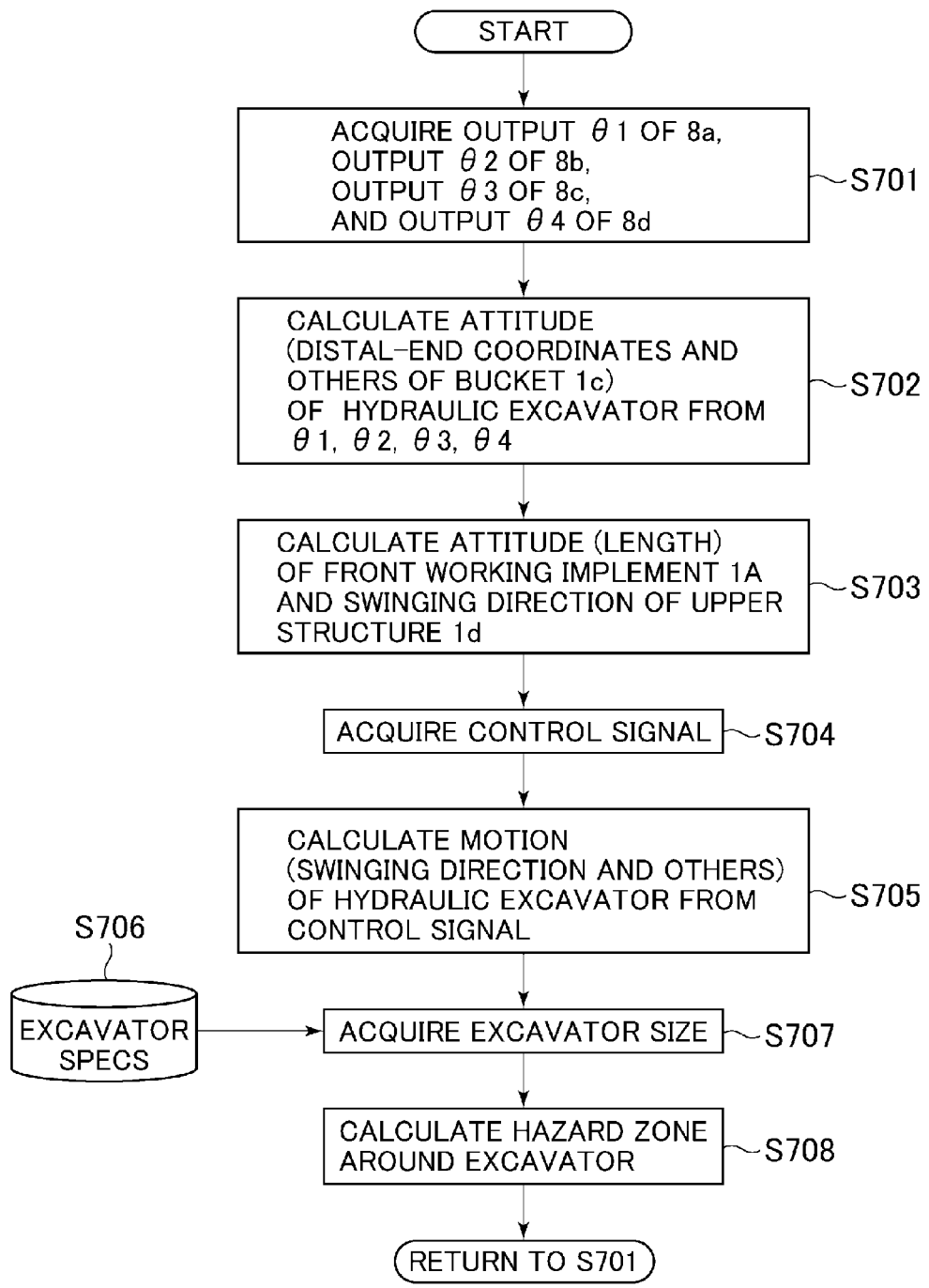
FIG. 9 is a flowchart of a process conducted in a hazard zone calculating unit 700 in the embodiment of the present invention.

FIG. 9 is a flowchart of the process conducted in the hazard zone calculating unit 700 in the embodiment of the present invention. Upon the start of peripheral monitoring by the peripheral monitoring device, the hazard zone calculating unit 700 first takes in the output θ1 signal from the angle detector 8a detecting the pivoting angle of the boom 1a, takes in the output θ2 signal from the angle detector 8b detecting the pivoting angle of the arm 1b, takes in the output θ3 signal from the angle detector 8c detecting the pivoting angle of the bucket 1c, and takes in the output θ4 signal from the angle detector 8d detecting the pivoting angle of the upper structure 1d (step S701). Next, the hazard zone calculating unit 700 calculates coordinates and height of a distal end of the bucket 1c from the output signals θ1, θ2, θ3, θ4 (step S702), and then calculates the attitude of the hydraulic excavator by calculating a size (length) of the front working implement 1A and a direction in which the upper structure 1d swings from the lower structure 1e (step S703).

Next, the hazard zone calculating unit 700 acquires the operation signal that is output from the operation device 30 (S704), and calculates the motion of the hydraulic excavator (moving directions of the boom 1a, the arm 1b, and the bucket 1c, swinging direction of the upper structure 1d, moving direction of the lower structure 1e, and the like), based upon the acquired operation signal (step S705).

Next, in step S707, the hazard zone calculating unit 700 next acquires the size of the hydraulic excavator (size of the upper structure 1d and the like), stored within an excavator specifications storage unit 706. In step S708, the unit 700 calculates the hazard zone around the hydraulic excavator, based upon the attitude of the hydraulic excavator that was calculated in step S703, the motion of the hydraulic excavator that was calculated in step S705, and the size of the hydraulic excavator that was calculated in step S707. After the calculation of the hazard zone, the hazard zone calculating unit 700 returns to step S701 and repeats step S701 onward.

The hazard zone around the hydraulic excavator is calculated by the execution of the above process. Successive steps S701 to S708 are executed on the basis of the data constantly changing during the operation of the hydraulic excavator. Accordingly, the hazard zone is calculated in operative association with the attitude and motion of the hydraulic excavator, so that a zone to be monitored is optimized. In addition, a warning can be displayed only when truly necessary, since as described later herein, the risk level setting unit 2000 is changing the contact risk level, depending upon whether the obstacle is present in the hazard zone or outside it. For example, if the warning is made to be displayed only when the obstacle is present in the hazard zone, a scene in which the motion of the hydraulic excavator will be limited is suppressed and working efficiency consequently improves. In the above, in terms of improving a state of the hydraulic excavator and the operative association of the hazard zone therewith, the hazard zone has been calculated on the basis of both of the attitude and motion of the hydraulic excavator. The calculation of the hazard zone, however, may be based upon either one of the attitude and motion of the hydraulic excavator. In addition to the above, the hazard zone may be calculated considering the time-varying changes in the angles θ detected by the angle detectors 8, that is, with a moving speed.

Figure 10:
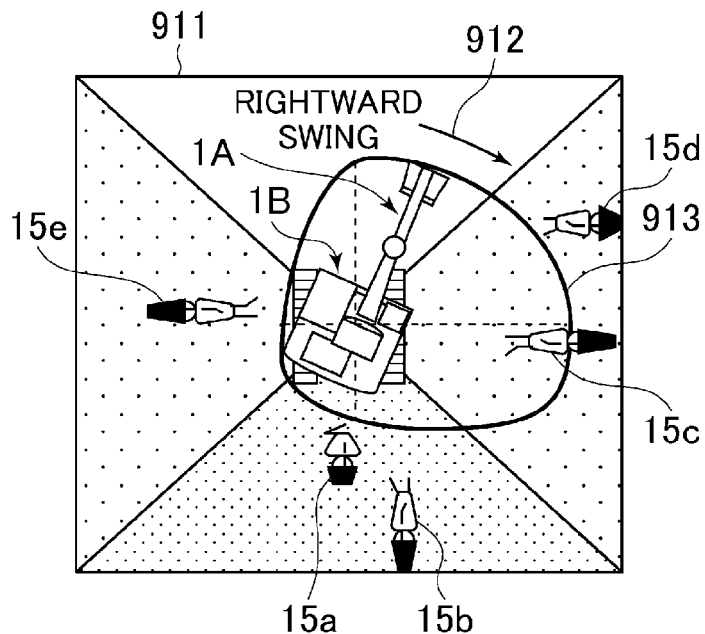
FIG. 10 is a diagram illustrating an example of a hazard zone calculated when an upper structure 1d swings rightward.
Figure 11:
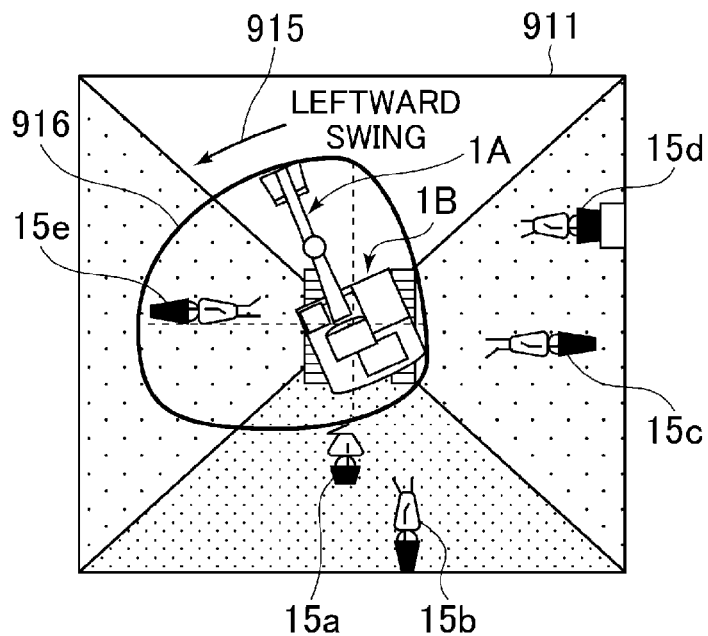
FIG. 11 is a diagram illustrating an example of a hazard zone calculated when the upper structure 1d swings leftward.
Figure 12:
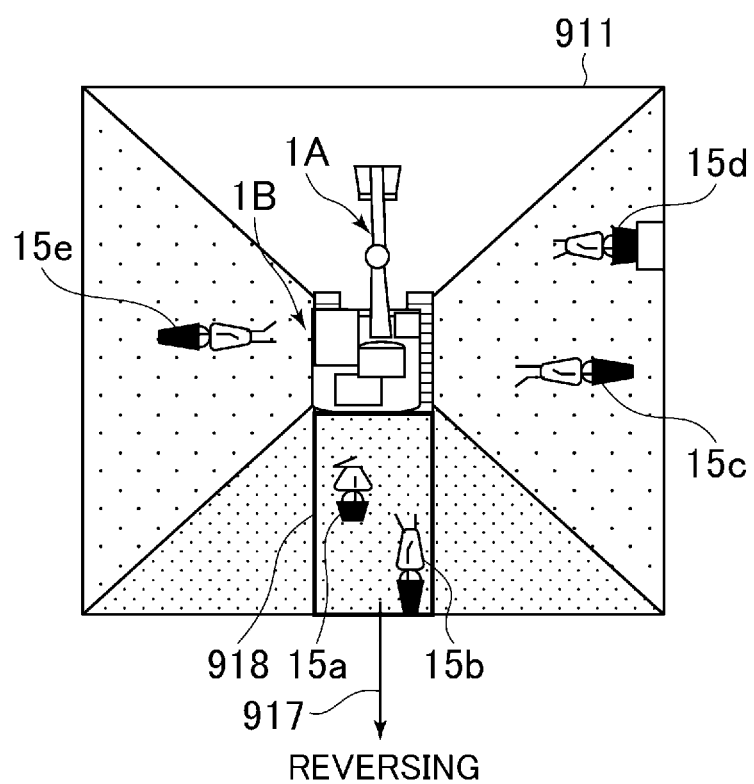
FIG. 12 is a diagram illustrating an example of a hazard zone calculated when a lower structure 1e moves in reverse.

FIGS. 10 to 12 show examples of a hazard zone calculated by the hazard zone calculating unit 700. In these examples, a description is conveniently given below using an image 911 formed when the bird's-eye image (detailed later) that is obtained by converting the images that have been acquired by the rearview camera 13a, the right-sideview camera 13b, and the left-sideview camera 13c, is further viewed from directly above the hydraulic excavator.

FIG. 10 is a diagram illustrating an example of a hazard zone calculated when the upper structure 1d swings rightward. Supposing that the upper structure 1d of the hydraulic excavator swings rightward as denoted by reference number 912, the front working implement 1A also moves in a rightward direction in synchronization with the rightward swing. The hazard zone calculating unit 700 then calculates the hazard zone around the hydraulic excavator, based upon the particular motional state of the excavator. To be more specific, the hazard zone 913 wide in the rightward direction that the upper structure 1d swings, and narrow in the rearward and leftward directions that are different from the swinging direction, is calculated synchronously with the motion of the hydraulic excavator. Since the hazard zone 913 is thus calculated synchronously with the motion of the hydraulic excavator, the zone that the peripheral monitoring device is to monitor is optimized.

FIG. 11 is a diagram illustrating an example of a hazard zone calculated when the upper structure 1d swings leftward. When the upper structure 1d swings leftward as denoted by reference number 915, the upper structure 1d also moves in the leftward direction in synchronization with the leftward swing. The hazard zone calculating unit 700 then calculates the hazard zone around the hydraulic excavator, based upon the particular motional state of the excavator. To be more specific, the hazard zone 916 wide in the leftward direction that the upper structure 1d swings, and narrow in the rearward and rightward directions that are different from the swinging direction, is calculated synchronously with the motion of the hydraulic excavator.

FIG. 12 is a diagram illustrating an example of a hazard zone calculated when the lower structure 1e moves in reverse. When the lower structure 1e moves in reverse as denoted by reference number 917, the upper structure 1d also moves in reverse in synchronization with the reverse movement of the lower structure. The hazard zone calculating unit 700 then uses the horizontal size (width) of the hydraulic excavator, acquired in step S707, to calculate the hazard zone around the hydraulic excavator, based upon the particular motional state of the excavator. To be more specific, the hazard zone calculating unit 700 calculates the hazard zone 918 having the same width as that of the hydraulic excavator, at the rear side thereof that is the direction in which the lower structure moves.

Figure 13:
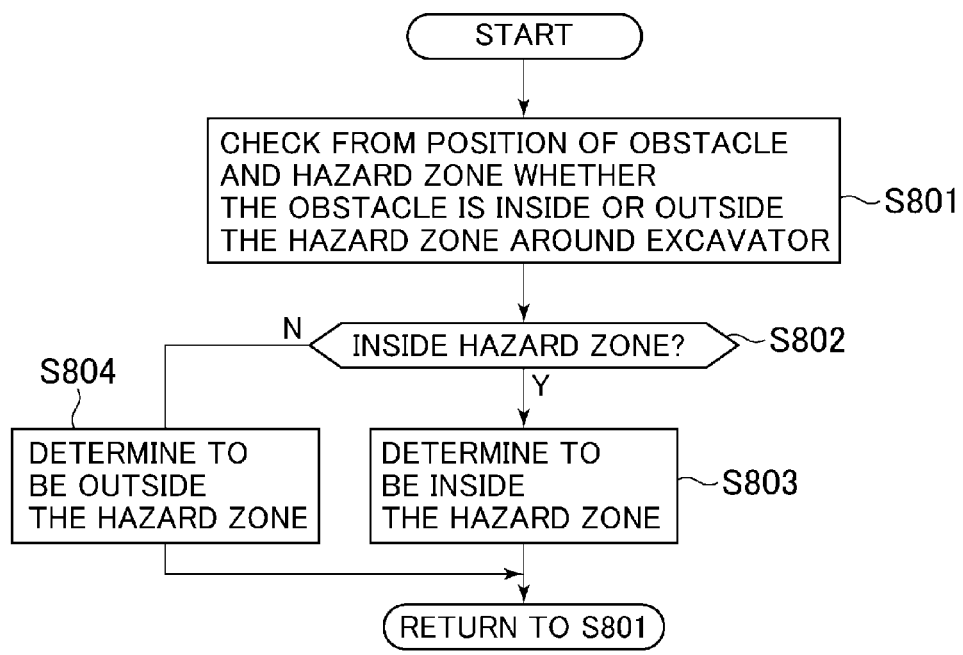
FIG. 13 is a flowchart of a process conducted in a determining unit 800 in the embodiment of the present invention.

FIG. 13 is a flowchart of a process conducted in the determining unit 800 in the embodiment of the present invention. Upon the start of peripheral monitoring by the peripheral monitoring device, the determining unit 800 determines whether the obstacle that the obstacle detection unit 400 detected is present in the hazard zone that the hazard zone calculating unit 700 has calculated (steps S801, S802). The determination is based upon the position of the obstacle, calculated by the position calculating unit 500. If, in step S802, the obstacle is determined to exist in the hazard zone, this result is stored into the storage device (step S803). If the obstacle is determined to exist outside the hazard zone, this result is likewise stored into the storage device (step S804). The thus-stored determination result is next used in other processing conducted by the risk level setting unit 2000, for example. Upon completion of storage into the storage device, the determination in step S801 is repeated at fixed time intervals for all obstacles. The execution of this process sequence enables determination for obstacles in the hazard zone.

Figure 14:
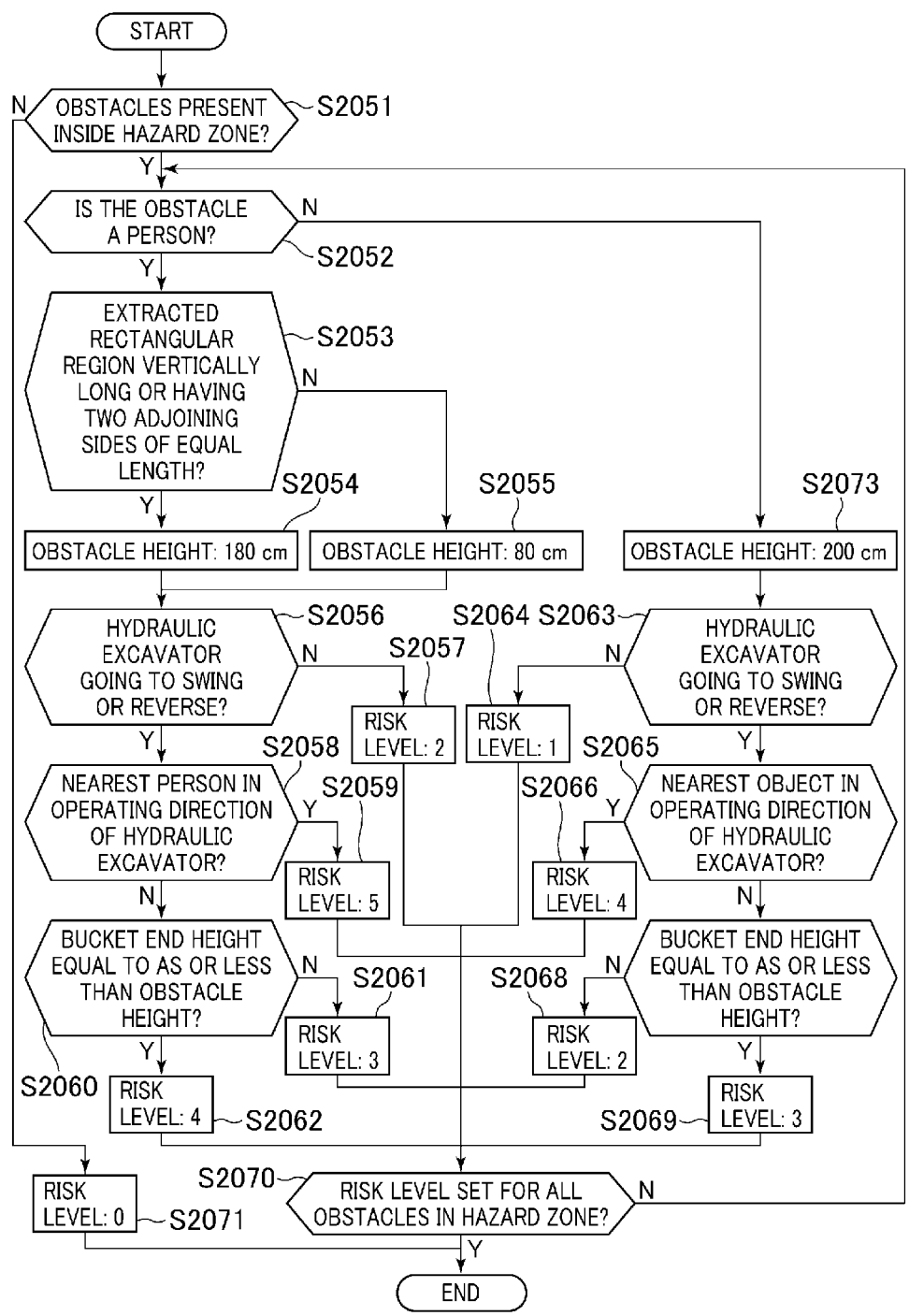
FIG. 14 is a flowchart of a process conducted in a risk level setting unit 2000 in the embodiment of the present invention.

FIG. 14 is a flowchart of the process conducted in the risk level setting unit 2000 in the embodiment of the present invention. Upon the start of peripheral monitoring by the peripheral monitoring device, the risk level setting unit 2000 checks for obstacles in the hazard zone (step S2051), the check being based upon the determination result by the determining unit 800. If, in step S2051, no obstacles are determined to exist in the hazard zone, the risk level setting unit 2000 completes the process without setting a contact risk level, in other words, just by setting risk level 0 (step S2071). Conversely if, in step S2051, obstacles are determined to exist in the hazard zone, the risk level setting unit 2000 sets an individual contact risk level for each obstacle within the hazard zone, based upon the type, position, and height of the obstacle that are obtained from the camera image.

In step S2052, if the obstacles present in the hazard zone include one for which the contact risk level is not set, the risk level setting unit 2000 checks whether the particular obstacle is a person or an object. If the obstacle is determined in step S2052 not to be a person, that is, determined to be an object, the risk level setting unit 2000 sets predetermined height (say, 200 cm) as the height of the obstacle (step S2073), and proceeds to step S2063.

Conversely if the obstacle is determined in step S2052 to be a person, the risk level setting unit 2000 determines whether the circumscribed rectangle, memory-stored by the obstacle detection unit 400, has a vertically long shape or whether two adjoining sides of the rectangle are of equal length (step S2053). This determination is based upon the coordinates of the upper left corner and lower right corner of the circumscribed rectangle. If, in step S2053, the circumscribed rectangle is determined to be vertically long in shape or to have two adjoining sides of equal length, the risk level setting unit 2000 estimates that the extracted region includes a standing person, sets predetermined height (say, 180 cm) as the height of that obstacle (step S2054), and proceeds to step S2056. In contrast, if, in step S2053, the circumscribed rectangle is determined not to be vertically long or have two adjoining sides of equal length, the risk level setting unit 2000 estimates that the extracted region includes, for example, a person who is keeping low, sets predetermined height (say, 80 cm) as the height of that obstacle (step S2055), and proceeds to step S2056.

In step S2056, whether the motion of the hydraulic excavator is a swing (leftward swing or a rightward swing) or reversing, is determined on the basis of the operation signal from the operation device, the time-varying changes in the detection angle θ4 by the angle detector 8d, or other information. If in step S2056 the hydraulic excavator is determined not to start swinging or reversing, the contact risk level is set to 2 (step S2057) and the process advances to step S2070. If in step S2056 the hydraulic excavator is determined to start swinging or reversing, the process advances to step S2058.

In step S2058, it is determined whether the obstacle, when compared with other obstacles in the hazard zone, is a person present at the nearest position of all obstacles existing in the direction that the hydraulic excavator is going to operate. More specifically, if in step S2058 the hydraulic excavator is determined to start swinging, a radius of a circle with a center at a swinging center of the hydraulic excavator is progressively increased from 0, until the distal end of the bucket has been reached. This draws a plurality of concentric circles. After this, it is determined whether the obstacle for which the contact risk level is to be set is a person present at the position closest to the front working implement 1A, in the swinging direction on the concentric circles. If in step S2058 the hydraulic excavator is determined to start reversing, it is determined whether the obstacle for which the contact risk level is to be set is a person present at the nearest position, at the rear of the hydraulic excavator. If in step S2058 the obstacle is determined to be a person present at the nearest position in the direction that the hydraulic excavator is going to operate, the contact risk level is set to 5 (step S2059) and the process advances to step S2070. That is to say, in step S2059, the highest contact risk level is set for, of all obstacles within the hazard zone that are determined to be persons in type, only the person (obstacle) present at the position closest to the front working implement 1A or the hydraulic excavator, in the swinging direction of the front working implement 1A or the reversing direction of the hydraulic excavator, respectively. The process advances to step S2060 if in step S2058 the obstacle is determined not to be the person present at the nearest position in the direction that the hydraulic excavator is going to operate.

In step S2060, it is determined whether the height of the distal end of the bucket 1c is the same as or less than the height of the obstacle, set in step S2054, S2055. If the height of the bucket 1c is the same as or less than the height set in step S2054, S2055, the contact risk level is set to 4 (step S2062) and the process advances to step S2070. Conversely if in step S2060 the height of the bucket 1c is determined to be greater than the height set in step S2054, S2055, the contact risk level is set to 3 (step S2061) and the process advances to step S2070.

In step S2063, whether the motion of the hydraulic excavator is a swing (leftward swing or a rightward swing) or reversing, is determined on the basis of the operation signal from the operation device, the time-varying changes in the detection angle θ4 by the angle detector 8d, or other information. If in step S2063 the hydraulic excavator is determined not to start swinging or reversing, the contact risk level is set to 1 (step S2064) and the process advances to step S2070. Conversely if in step S2063 the hydraulic excavator is determined to start swinging or reversing, the process advances to step S2065.

In step S2065, it is determined whether the obstacle, when compared with other obstacles in the hazard zone, is an object present at the nearest position of all obstacles existing in the direction that the hydraulic excavator is going to operate. A more specific method of the determination is the same as that described in step S2058. If in step S2065 the obstacle is determined to be an object present at the nearest position in the direction that the hydraulic excavator is going to operate, the contact risk level is set to 4 (step S2066) and the process advances to step S2070. That is to say, in step S2066, the highest contact risk level is set for, of all obstacles within the hazard zone that are determined to be objects in type, only the object (obstacle) present at the position closest to the front working implement 1A or the hydraulic excavator, in the swinging direction of the front working implement 1A or the reversing direction of the hydraulic excavator, respectively. The process advances to step S2067 if in step S2065 the obstacle is determined not to be the object present at the nearest position in the direction that the hydraulic excavator is going to operate.

In step S2067, it is determined whether the height of the distal end of the bucket 1c is the same as or less than the height of the obstacle, set in step S2073. If the height of the bucket 1c is the same as or less than the height set in step S2073, the contact risk level is set to 3 (step S2069) and the process advances to step S2070. Conversely if in step S2067 the height of the bucket 1c is determined to be greater than the height set in step S2073, the contact risk level is set to 2 (step S2068) and the process advances to step S2070.

In step S2070, the risk level setting unit 2000 checks whether the contact risk level has been set for all obstacles existing in the hazard zone. If in step S2070 an obstacle for which the contact risk level is not yet set is detected in the hazard zone, the risk level setting unit 2000 returns to step S2052 and repeats step S2052 onward. The risk level setting unit 2000 temporarily terminates the process if in step S2070 the contact risk level is determined to be set for all obstacles.

After the temporary termination, if the hazard zone is updated or new obstacles are detected, the above successive steps are executed once again for risk level setting. In this way, the contact risk level is set for all obstacles existing in the hazard zone. In this setting process, if a person is present in the hazard zone during the swinging or reversing of the hydraulic excavator, the contact risk level of 5 can be set for that person.

The contact risk level based upon the type of obstacle (whether a person or an object), the position thereof (whether in the hazard zone or near the hydraulic excavator), and the height thereof (whether lower than the distal end of the bucket 1c), has been set in the above example. The contact risk level based upon at least one of these criteria, however, may be set for each obstacle.

Figure 15:
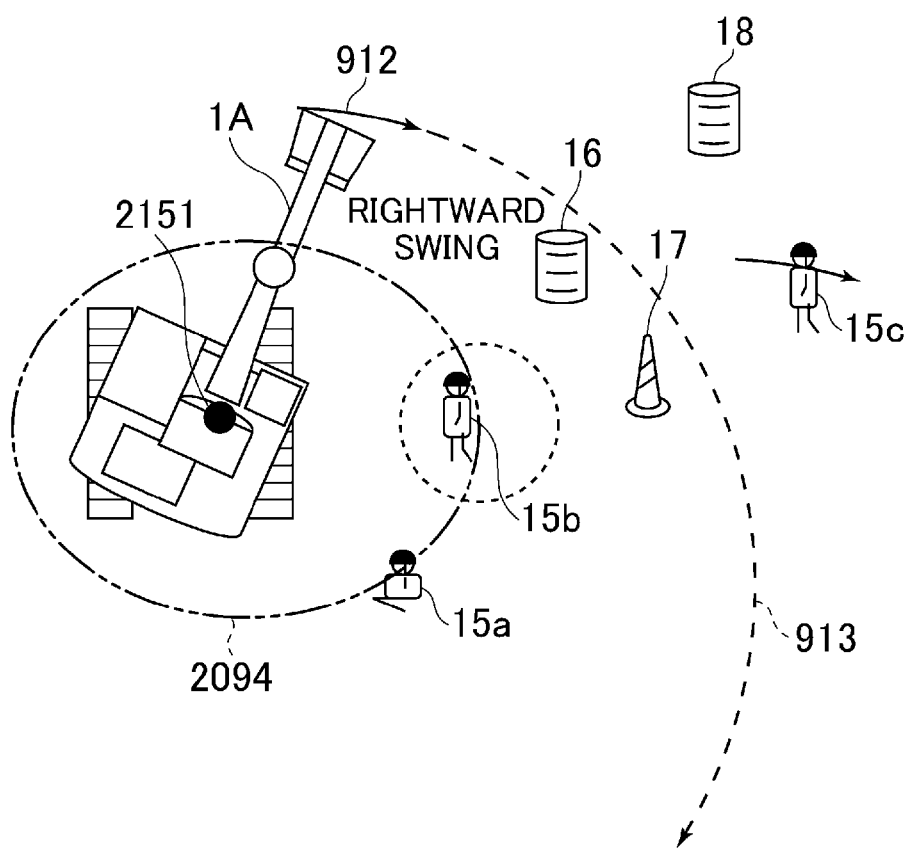
FIG. 15 is a first explanatory diagram relating to the risk level setting process conducted in the risk level setting unit 2000.

FIG. 15 is a first explanatory diagram relating to the risk level setting process conducted in the risk level setting unit 2000. FIG. 15 assumes that the hydraulic excavator swings rightward, that objects 16, 17, and persons 15a, 15b are present in the hazard zone 913, that an object 18 and a person 15c are present outside the hazard zone 913, and that the distal end of the bucket 1c is 150 cm high.

In the example of FIG. 15, contact risk level setting in accordance with steps S2051, S2071 does not take place for the object 18 and person 15c present outside the hazard zone 913. The distal end of the bucket 1c is 150 cm high, so for the object 16 present in the hazard zone 913, contact risk level 4 is set in accordance with steps S2065, S2066 since the object 16 is closest to the region of a concentric circle 2094 that is equidistant from the swinging center 2151 of the upper structure 1d, in the direction that the front working implement 1A is going to move. For the object 17, contact risk level 3 is set in accordance with steps S2067, S2069. For the person 15b, contact risk level 5 is set in accordance with steps S2058, S2059 since the person 15b is closest to the region of the concentric circle 2094 that is equidistant from the swinging center 2151 of the upper structure 1d, in the direction that the front working implement 1A is going to move. For the person 15c, contact risk level 3 is set in accordance with steps S2060, S2061. Briefly, the person 15b has the highest level of a contact risk, in FIG. 15.

Figure 16:
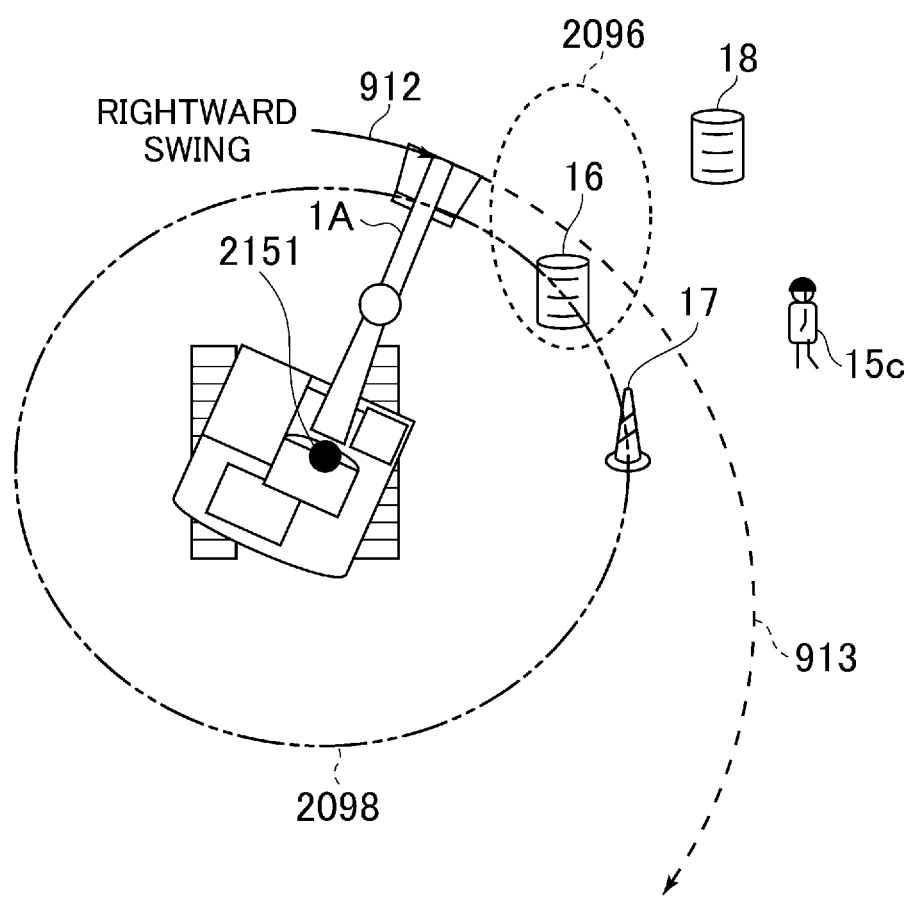
FIG. 16 is a second explanatory diagram relating to the risk level setting process conducted in the risk level setting unit 2000.

FIG. 16 is a second explanatory diagram relating to the risk level setting process conducted in the risk level setting unit 2000. FIG. 16 assumes that the hydraulic excavator swings rightward, that objects 16, 17 are present in the hazard zone 913, that an object 18 and a person 15c are present outside the hazard zone 913, and that the distal end of the bucket 1c is 150 cm high.

In the example of FIG. 16, as in that of FIG. 15, contact risk level setting in accordance with steps S2051, S2071 does not take place for the object 18 and person 15c present outside the hazard zone 913. The distal end of the bucket 1c is 150 cm high, so for the object 16 present in the hazard zone 913, contact risk level 4 is set in accordance with steps S2065, S2066 since the object 16 is closest to the region of a concentric circle 2098 that is equidistant from the swinging center 2151 of the upper structure 1d, in the direction that the front working implement 1A is going to move. For the object 17, contact risk level 3 is set in accordance with steps S2067, S2069. Briefly, the person 16 has the highest level of a contact risk, in FIG. 16.

Figure 17:
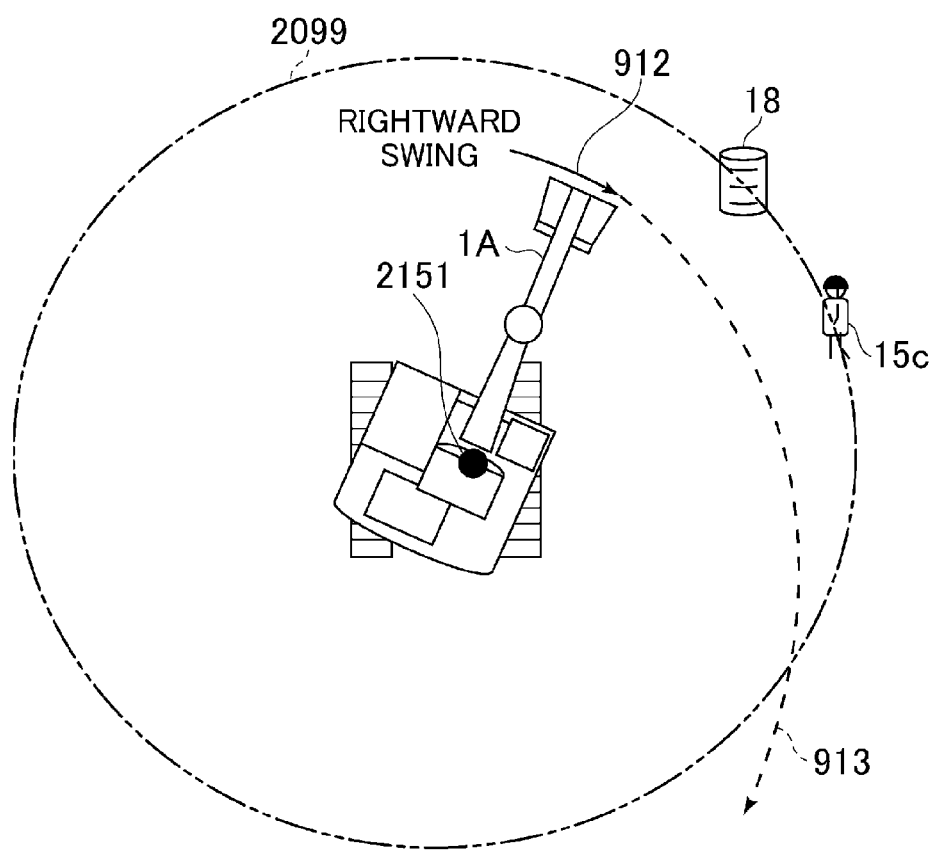
FIG. 17 is a third explanatory diagram relating to the risk level setting process conducted in the risk level setting unit 2000.

FIG. 17 is a third explanatory diagram relating to the risk level setting process conducted in the risk level setting unit 2000. FIG. 17 assumes that the hydraulic excavator swings rightward and that an object 18 and a person 15c are present outside the hazard zone 913. In the example of FIG. 17, since the obstacles 18, 15c are both present outside the hazard zone 913, contact risk level 0 is set for each obstacle. Briefly, an obstacle for which a contact risk level will be set does not exist in the example of FIG. 17.

Figure 18:
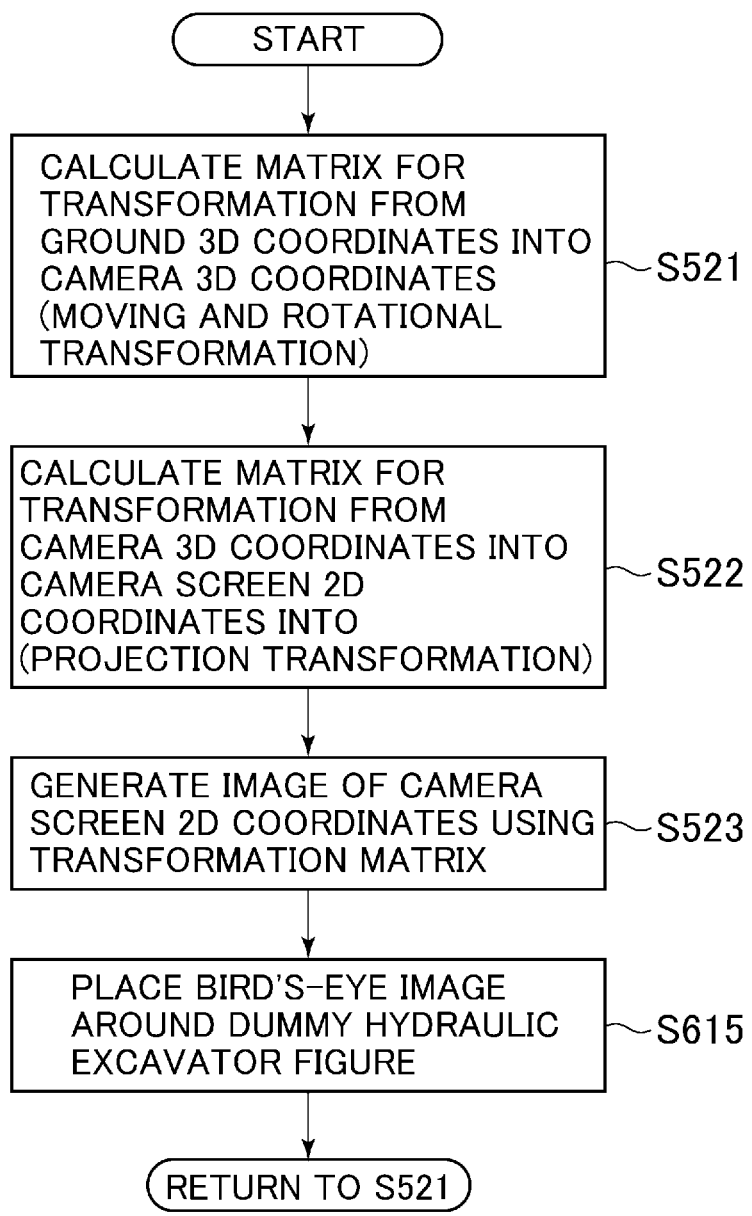
FIG. 18 is a flowchart of a process conducted in a bird's-eye image generator 610 in the image generating unit 600.

The process conducted in the image generating unit 600 in the embodiment of the present invention is next described below. FIG. 18 is a flowchart of the process conducted by the bird's-eye image generator 610 in the image generating unit 600. The bird's-eye image generator 610 first calculates the transformation matrix for transforming ground 3D coordinates into camera 3D coordinates (step S521). The image generator 610 also calculates the transformation matrix for transforming the camera 3D coordinates into camera screen 2D coordinates (step S522). The image generator 610 further uses the transformation matrices to generate a bird's-eye image as an image of the camera screen 2D coordinates from the camera image (step S523). Next, the image generator 610 places the bird's-eye image that it has generated through steps S521, S522, S523, around a dummy working-machine figure graphically representing the hydraulic excavator, and then after returning to step S521, repeats step S521 onward. In the present embodiment, the bird's-eye image by the rearview camera 13a is placed at rear of the dummy working-machine figure, a bird's-eye image by the right-sideview camera 13b is placed at the right side of the dummy working-machine figure, and a bird's-eye image by the left-sideview camera 13c is placed at the left side of the dummy working-machine figure. A bird's-eye image of the hydraulic excavator periphery is thus generated.

Figure 19:
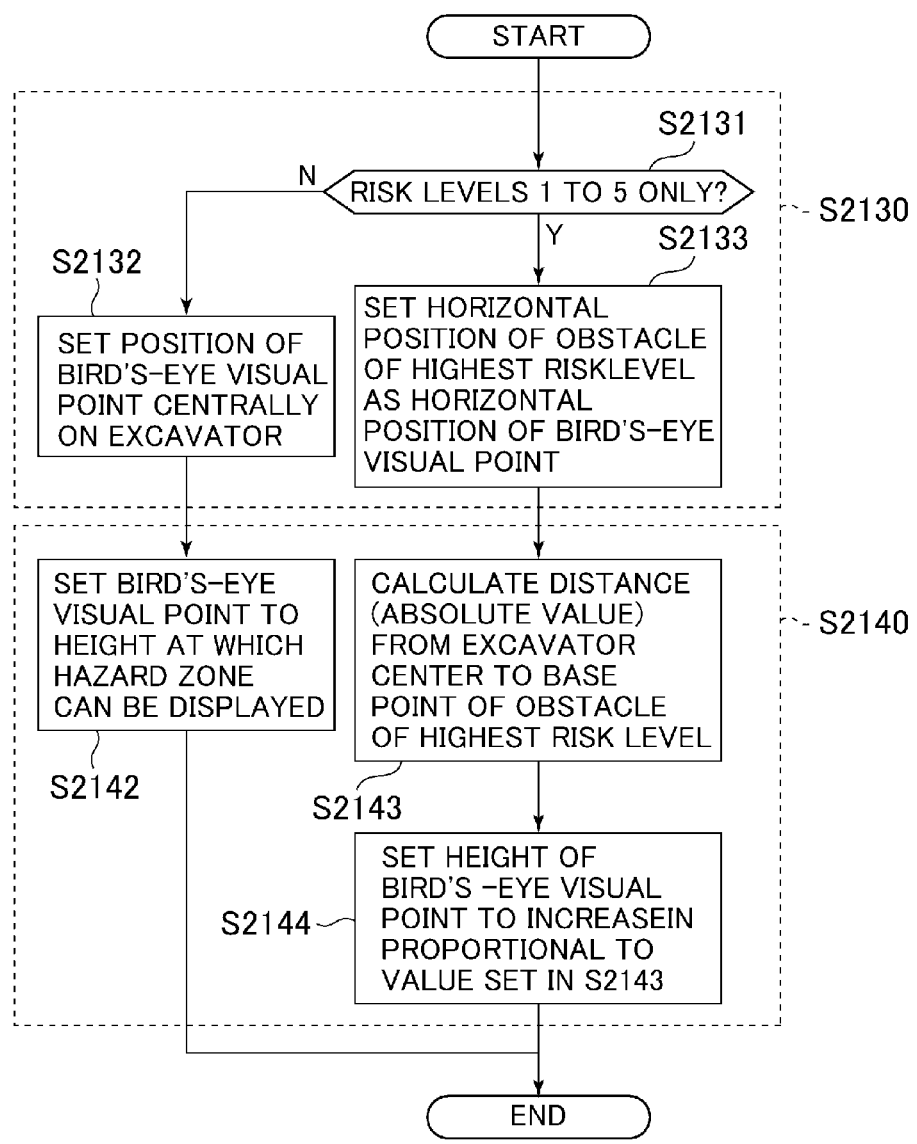
FIG. 19 is a flowchart of a process conducted in a bird's-eye visual-point setting unit 2100 (a bird's-eye position setter 2130 and bird's-eye height setter 2140) of the image generating unit 600.

FIG. 19 is a flowchart of the process conducted in the bird's-eye visual-point setting unit 2100 (the bird's-eye position setter 2130 and bird's-eye height setter 2140) of the image generating unit 600. After the risk level setting unit 2000 has set the risk levels for the obstacles in the hazard zone, the bird's-eye position setter 2130 checks the contact risk levels of each obstacle (step S2131). If in step S2131 the contact risk levels of each obstacle are other than 1 to 5 (i.e., all risk levels are 0), the bird's-eye position setter 2130 sets the position of the bird's-eye visual point on the horizontal surface, as a central portion of the hydraulic excavator (step S2132), and advances the process to step S2142. If in step S2131 the contact risk levels of each obstacle include 1 to 5, the bird's-eye position setter 2130 sets a horizontal position of the obstacle having the highest level of a contact risk, as the position of the bird's-eye visual point on the horizontal surface (step S2133), and advances the process to step S2143.

In step S2142, the bird's-eye height setter 2140 sets the height of the bird's-eye visual point to a value (set value) previously assigned so that the hazard zone can be displayed when looked down upon the hydraulic excavator from above the central portion (swinging center) thereof. After this, the bird's-eye height setter 2140 stores the horizontal position and height position of the bird's-eye visual point into the storage device and completes the process.

In step S2143, on the other hand, the bird's-eye height setter 2140 calculates an absolute value of a distance from the central portion of the hydraulic excavator to the base point (described in step S502) of the obstacle having the highest level of a contact risk, the base point having been used in step S2133, and then calculates the height (e.g., 2 to 3 times that of the obstacle) of the bird's-eye visual point in proportion to the above-calculated value (step S2144). The proportionality constant by which the value calculated in step S2143 is to be multiplied in step S2144 can be such that the hazard zone can be displayed when looked down upon the central portion of the hydraulic excavator from above the obstacle of the highest contact risk level. After the bird's-eye height setter 2140 has calculated the height of the bird's-eye visual point in this way, the setter 2140 stores the horizontal position of the bird's-eye visual point that was set in step S2133, and the height position set in step S2144, into the storage device and completes the process.

If the contact risk levels are already set through the above process, a bird's-eye visual point looking down towards the hydraulic excavator and the hazard zone is set up above the obstacle of the highest contact risk level of all those which the risk level setting unit 2000 has set for each obstacle. If a contact risk level is not set, a bird's-eye visual point looking down towards the hydraulic excavator and the hazard zone from above the excavator is set up.

Figure 20:
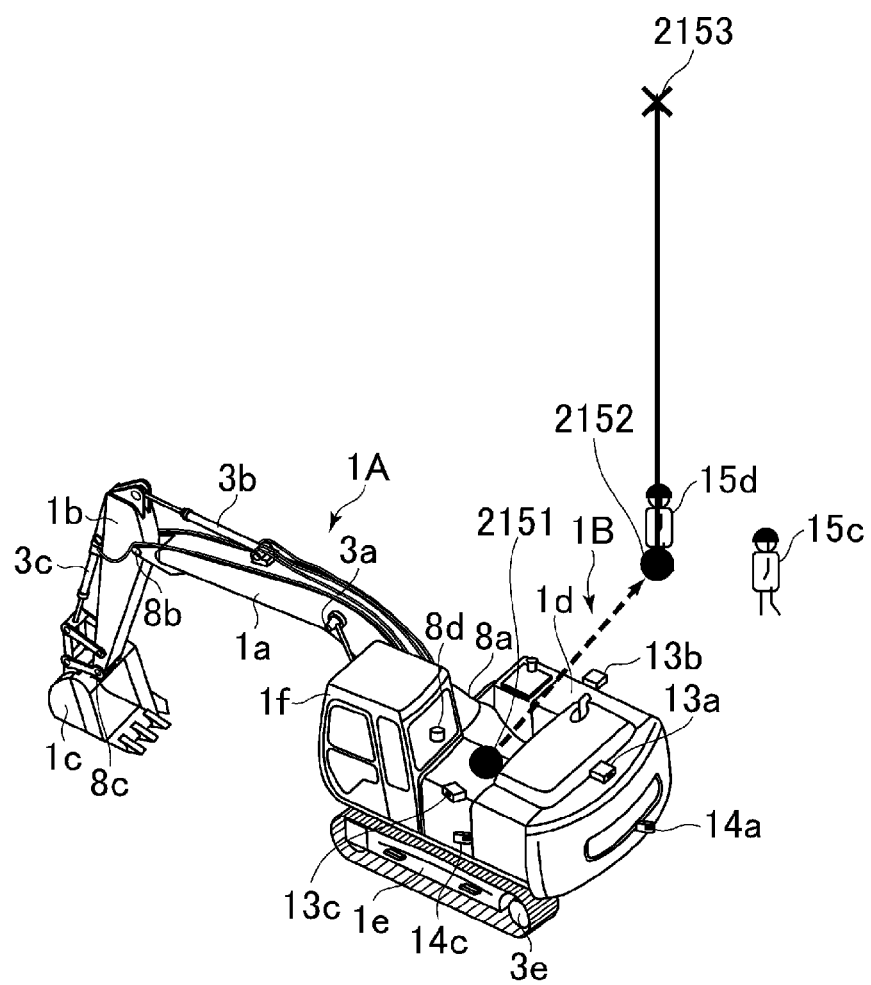
FIG. 20 is a conceptual diagram showing an example in which the bird's-eye visual-point setting unit 2100 sets a bird's-eye visual point.

FIG. 20 is a conceptual diagram showing an example in which the bird's-eye visual-point setting unit 2100 sets a bird's-eye visual point. In FIG. 20, which assumes that the highest contact risk level is set for a person 15d, a horizontal position 2152 of the person 15d is first set as that of the bird's-eye visual point in step S2133. In step S2143, a value of a difference (absolute value) between the central portion 2151 of the hydraulic excavator and the horizontal position 2152 is calculated and then this calculated value is multiplied by a proportionality constant appropriate for a particular magnitude of the calculated value, to set the height 2153 of the bird's-eye visual point. This allows position setting of the bird's-eye visual point (virtual camera) existing when the monitoring image generator 620 generates the monitoring image.

Figure 21:
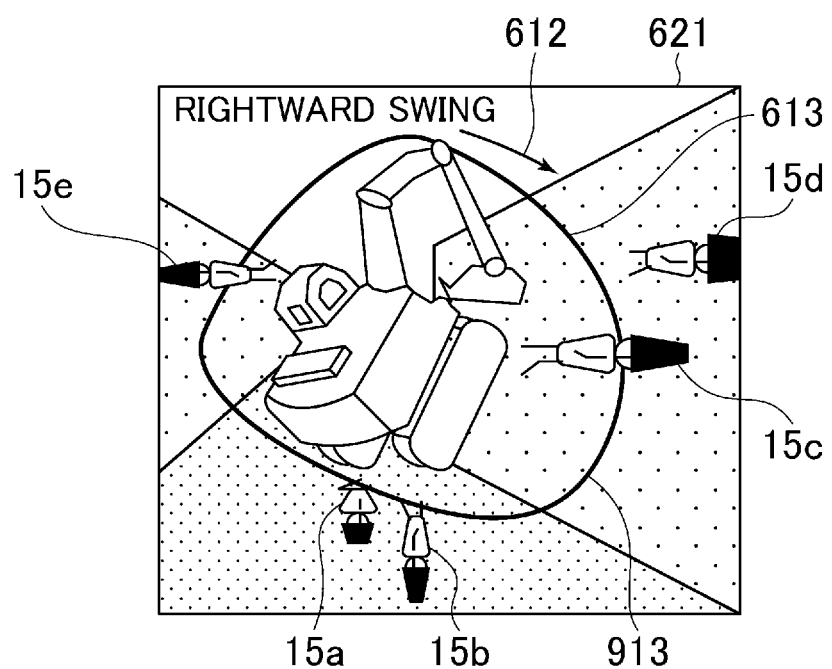
FIG. 21 is a diagram showing a first example of a monitoring image which a monitoring image generator 620 in the image generating unit 600 generates.

FIG. 21 is a diagram showing a first example of a monitoring image which the monitoring image generator 620 in the image generating unit 600 generates. In a scene that FIG. 21 shows, when the hydraulic excavator is swung rightward as denoted by reference number 612, the front working implement 1A also moves in a rightward direction in synchronization with the rightward swing. The risk level setting unit 2000 then sets highest contact risk level 5 for a person 15c present at the right side of the front working implement 1A in the hazard zone 913. Next, the bird's-eye visual-point setting unit 2100 sets up the bird's-eye visual point atop the person 15c and the monitoring image generator 620 generates, as a monitoring image 621, an image of the hydraulic excavator and hazard zone as viewed through the virtual camera from the bird's-eye visual point. Since the hydraulic excavator and the obstacle of the highest contact risk level will be displayed in the thus-generated monitoring image 621, the operator can instantly recognize the obstacle with which the hydraulic excavator is most likely to come into contact and the position of this obstacle relative to the excavator, without conducting a special judgment. In particular, this form of generating the monitoring image allows enlarged display of the situation in the operating direction (rightward swinging direction) of the hydraulic excavator, and hence, enlarged display of the most potentially hazardous obstacle (person 15c) present in the operating direction. In accordance with the present embodiment, therefore, working efficiency of the hydraulic excavator improves since the operator can instantly recognize the position of the most potentially hazardous obstacle relative to the excavator.

Figure 22:
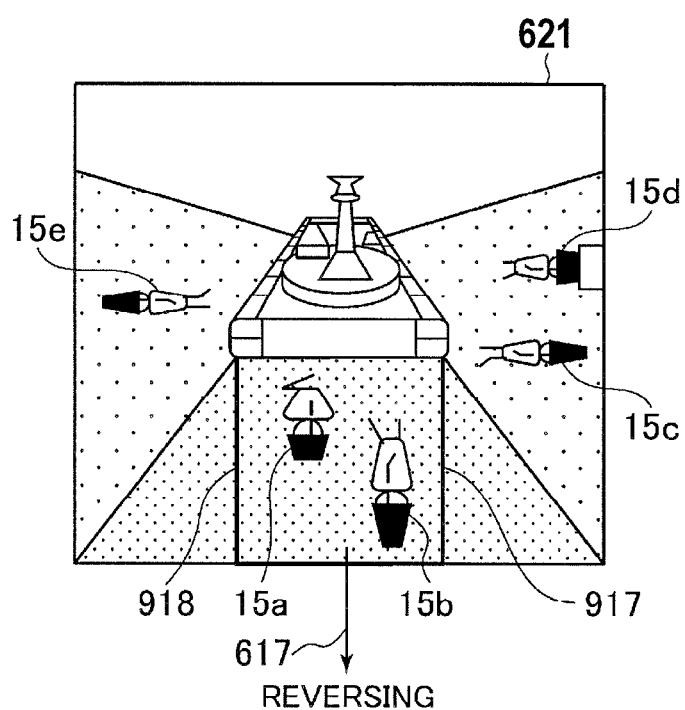
FIG. 22 is a diagram showing a second example of a monitoring image which the monitoring image generator 620 in the image generating unit 600 generates.

FIG. 22 is a diagram showing a second example of a monitoring image which the monitoring image generator 620 in the image generating unit 600 generates. In a scene that FIG. 22 shows, when the lower structure 1e is moved in reverse as denoted by reference number 617, the front working implement 1A and the upper structure 1d also move backward in synchronization with the reverse movement. The risk level setting unit 2000 then sets highest contact risk level 5 for a person 15a present at rear of the lower structure 1e in the hazard zone 917. Next, the bird's-eye visual-point setting unit 2100 sets up the bird's-eye visual point atop the person 15a and the monitoring image generator 620 generates an image of the hydraulic excavator and hazard zone as viewed from the bird's-eye visual point, as a monitoring image 621. In this example, therefore, the working efficiency of the hydraulic excavator also improves since the operator can instantly recognize the position of the most potentially hazardous obstacle relative to the excavator.

Figure 23:
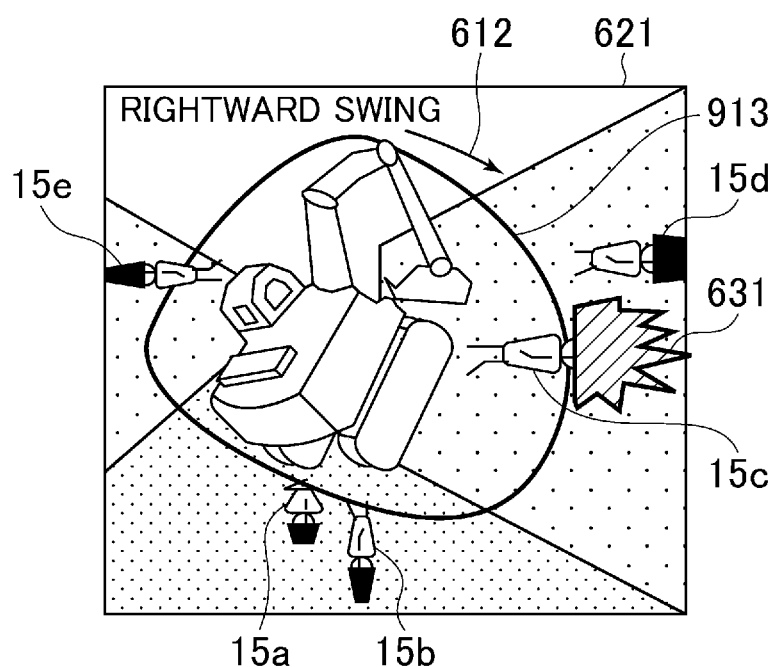
FIG. 23 is a diagram showing a third example of a monitoring image which the monitoring image generator 620 in the image generating unit 600 generates.

FIG. 23 is a diagram showing a third example of a monitoring image which the monitoring image generator 620 in the image generating unit 600 generates. As shown in this diagram, in order to improve the operator's visibility as to which obstacle is most likely to be hazardous, the monitoring image generator 620 depicts the warning symbol 631 in superimposed form atop an obstacle (person 15c) for which the risk level setting unit 2000 has set the highest level of a contact risk. In the example of this diagram, a substantially star-shaped figure is depicted as the warning symbol upon the person 15c.

Figure 24:
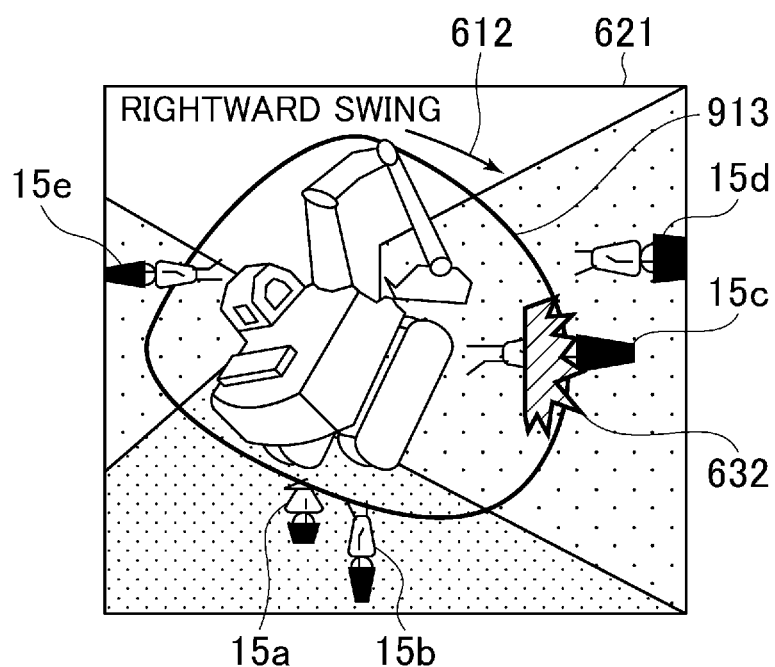
FIG. 24 is a diagram showing a fourth example of a monitoring image which the monitoring image generator 620 in the image generating unit 600 generates.

Additionally in the example of this diagram, in order to allow the operator to readily recognize from the monitoring image a vertical position at which the distal end of the bucket 1c is likely to come into contact with an obstacle, the warning symbol 631 is presented in superimposed form at the section with which the distal end of the bucket 1c is estimated to come into contact if the rightward swing is continued. That is, the warning symbol 631 is presented on the head of the person 16 in the example of FIG. 23. When the warning symbol 631 is to be made at the estimated contact section in this way, a comparison is conducted between the obstacle height that was set in step S2054, S2055, S2073 of the process conducted by the risk level setting unit 2000, and the height of bucket distal end that has been calculated using the output signals θ1 to 84 of the angle detectors 8a to 8d. For example, (1) if the bucket 1c is likely to come into contact with an upper half of the obstacle height, the warning symbol 631 is made atop the obstacle (if a person, then the head), or (2) if the bucket 1c is likely to come into contact with a lower half of the obstacle height, the warning symbol 631 is made at a lower part of the obstacle (if a person, then the trunk). FIG. 24 is a diagram showing a fourth example of a monitoring image which the monitoring image generator 620 in the image generating unit 600 generates, the monitoring image 621 assuming that a warning symbol 632 is made at the trunk of a person 15c.

Figure 25:
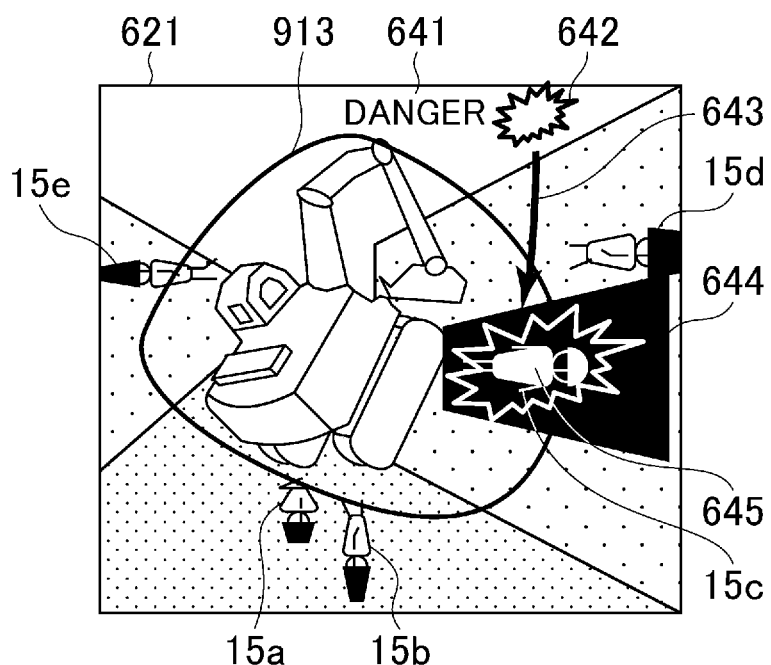
FIG. 25 is a diagram showing a fifth example of a monitoring image which the monitoring image generator 620 in the image generating unit 600 generates.

FIG. 25 is a diagram showing a fifth example of a monitoring image which the monitoring image generator 620 in the image generating unit 600 generates. As shown in this diagram, if the type of obstacle for which the risk level setting unit 2000 has set the highest level of a contact risk is a person, an image 645 representing a person is depicted in superimposed form upon a monitoring image 621 so as to surround the obstacle (person 15c) for which the highest level of a contact risk has been set. In the example of FIG. 25, the image (photograph) representing the person 15c extracted when the camera image is not converted into bird's-eye image form is depicted as the person-representing display 645 in such a form as to surround the person 15c.

If a monitoring image is generated using only a bird's-eye image, sections more distant from the camera 13 are displayed in larger sizes, for which reason, the display of the object is most often distorted (e.g., a person's body regions closer to the head are displayed in more enlarged form). The obstacles existing at a long distance from the camera 13 might therefore lack visibility since these obstacles may impart an uncomfortable feeling due to the distortion caused during conversion into bird's-eye image form. Accordingly if, as described above, the image 645 representing a person is depicted in superimposed form upon the monitoring image, the operator can instantly understand where on the monitoring image a person is present.

For further improved visibility of the person 15c present in the region 644 of the circumscribed rectangle, the above image 645 is preferably depicted in a conspicuous color that is readily identifiable to the operator and that doesn't exist in the image acquired by the camera 13. Additionally, as shown in a previous example, a character string of "DANGER", 641, and an arrow 643 indicating the obstacle of the highest contact risk level may be displayed as a warning message or pictorial in superimposed form or a substantially star-shaped FIG. 642 may be displayed as a warning in superimposed form near the character string 641, for even higher visibility.

Figure 26:
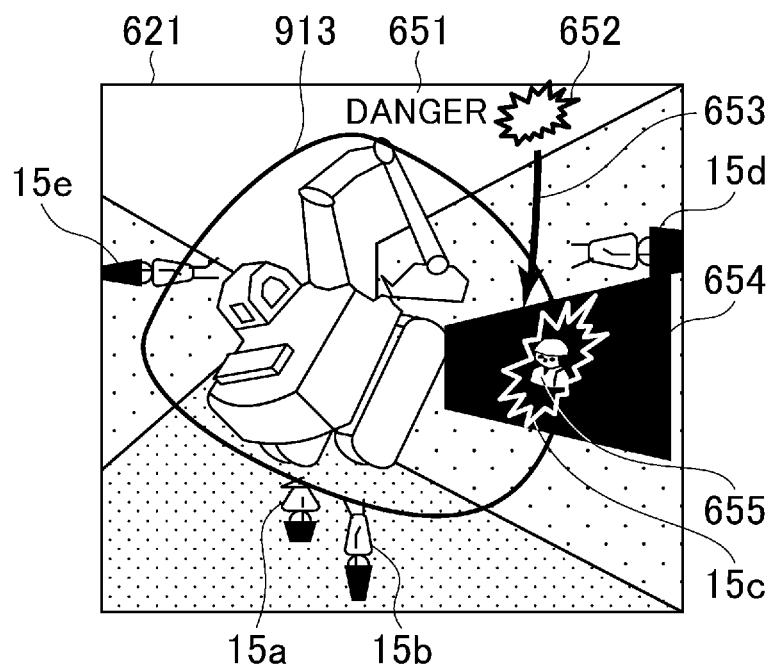
FIG. 26 is a diagram showing a sixth example of a monitoring image which the monitoring image generator 620 in the image generating unit 600 generates.

FIG. 26 is a diagram showing a sixth example of a monitoring image which the monitoring image generator 620 in the image generating unit 600 generates. While the image 645 acquired by the camera 13 has been used as a person-representing image in FIG. 25, the example of FIG. 26 differs in that an illustration 655 representing an upper body of a person three-dimensionally is used as the person-representing image. Using an alternative method of representation in this way also enables the operator to instantly recognize where on the monitoring image a person is present. As in the example of FIG. 25, a character string 651, a substantially star-shaped FIG. 652, an arrow 653, and/or the like may be displayed as a warning message or pictorial in superimposed form for even higher visibility.

Figure 27:
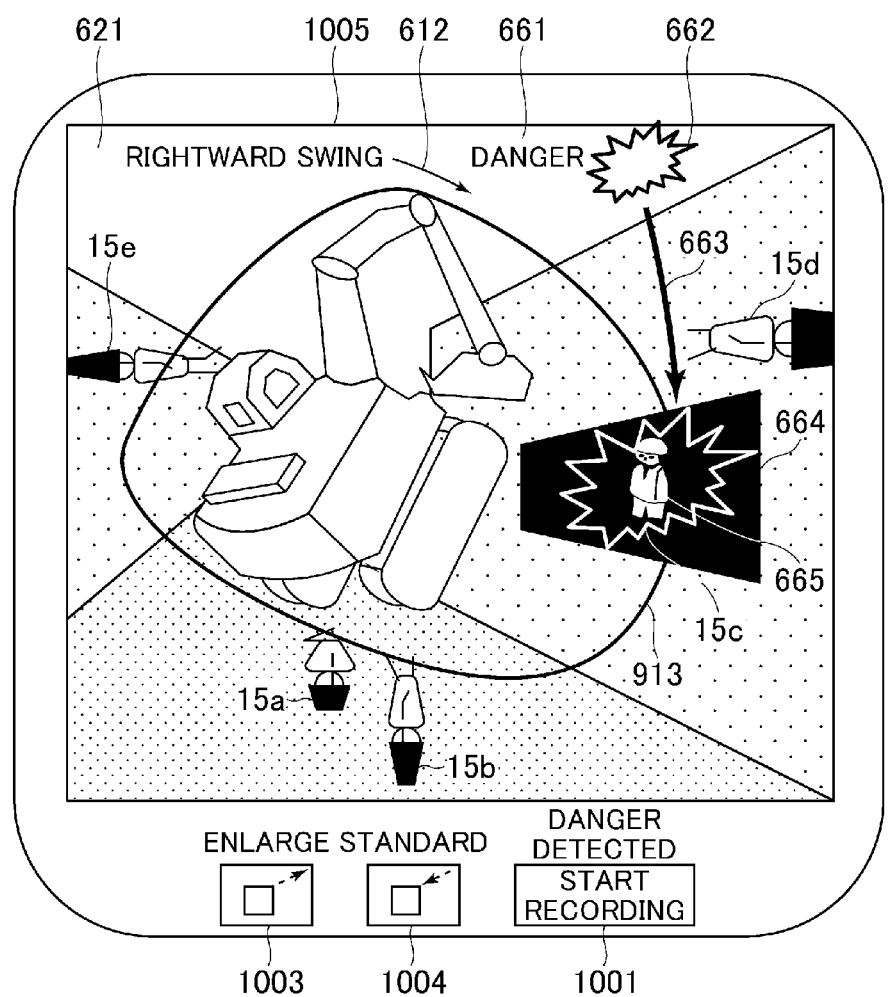
FIG. 27 is a diagram showing an example of a display screen of a display device 1300 in the embodiment of the present invention.

FIG. 27 is a diagram showing an example of a display screen of the display device 1300 in the embodiment of the present invention. The display screen shown in FIG. 27 includes a main display region 1005 for displaying a monitoring image generated by the image generating unit 600, a start recording button 1001 for recording over a predetermined time the monitoring image displayed in the main display region 1005, an enlarge display button 1003 for displaying a monitoring image in enlarged form, and a standard display button 1004 for resetting the enlarging function of the enlarge display button 1003. In the monitoring image shown in FIG. 27, an illustration 665 representing a person's whole body three-dimensionally is displayed as an image representing a person. In addition, as in the examples of FIGS. 25, 26, a character string 661, a substantially star-shaped FIG. 662, an arrow 663, and/or the like may be displayed as a warning message or pictorial in further superimposed form.

If the start recording button 1001 is provided as shown, the monitoring image displayed in the main display region 1005 can be optionally recorded when an obstacle (person 15c) with which the hydraulic excavator is likely to come into contact during operation is present around the excavator. Hence, even in case of an accident, the recorded image data can be used to investigate causes of the accident. The display device 1300 may be set so that even if the start recording button 1001 is not pressed, the monitoring image will be recorded automatically when a warning symbol is displayed in the main display region 1005. The same also applies to the enlarged display of the monitoring image; the monitoring image may be manually displayed in enlarged form by operation of the enlarge display button 1003 or automatically displayed in enlarged form when the warning symbol is displayed.

DESCRIPTION OF REFERENCE SYMBOLS

1A Front working implement
1B Vehicle body
1a Boom
1b Arm
1c Bucket
1d Upper structure
1e Lower structure
1f Cabin
3a to 3c Hydraulic actuators
3e Traveling motor
8a, 8b, 8c, 8d Angle detectors
13a, 13b, 13c Cameras (Image sensors)
14a, 14b, 14c Millimeter-wave radars
15a, 15b, 15c, 15d, 15e Obstacles (Persons)
16, 17 Obstacles (Objects)
30 Operation device
400 Obstacle detection unit
500 Position calculating unit
600 Image generating unit
610 Bird's-eye image generator
620 Monitoring image generator
700 hazard zone calculating unit
800 Determining unit
1300 Display device
2000 Risk level setting unit
2100 Bird's-eye visual-point setting unit
2130 Bird's-eye position setter
2140 Bird's-eye height setter

The invention claimed is:

1. A peripheral monitoring device for a working machine, comprising:
imaging means that acquires an image of periphery of the working machine;
obstacle detecting means that detects obstacles present around the working machine;
position calculating means that calculates positions of each of the detected obstacles relative to the working machine;
hazard zone calculating means that calculates a hazard zone around the working machine, based upon at least one of an attitude and motion of the working machine;
determining means that determines, by the calculated positions of the obstacles, whether further obstacles are present in the calculated hazard zone;
risk level setting means that sets, for any obstacles determined by the determining means to be present in the hazard zone, a contact risk level based upon at least one of the type, position, and height of each obstacle;
image generating means that converts the acquired image into a bird's-eye image obtained when the acquired image is viewed from a bird's-eye visual point set above the working machine, and then generates an image in which a position of the bird's-eye visual point in the bird's-eye image is changed according to the contact risk level set by the risk level setting means; and
display means that displays the generated image.

2. The peripheral monitoring device for a working machine according to claim 1, wherein:
the risk level setting means further sets a contact risk level based upon at least one of the attitude and motion of the working machine.

3. The peripheral monitoring device for a working machine according to claim 2, wherein:
the working machine includes a traveling structure, a swinging structure swingably installed upon the traveling structure, and a front working implement connected to the swinging structure; and
the risk level setting means further sets the highest contact risk level for, among all obstacles of the same type, only an obstacle present at the position closest to the front working implement, in a direction that the swinging structure is going to swing.

4. The peripheral monitoring device for a working machine according to claim 1, wherein:
in the generated image, the image generating means displays a warning image in superimposed form upon the obstacle having the highest contact risk level set by the risk level setting unit.

5. The peripheral monitoring device for a working machine according to claim 1, wherein:
if the type of obstacle having the highest contact risk level set by the risk level setting unit is a person, the image generating means depicts an image representing a person, in superimposed form upon the obstacle in the generated image.

6. The peripheral monitoring device for a working machine according to claim 2, wherein:
in the generated image, the image generating means displays a warning image in superimposed form upon the obstacle having the highest contact risk level set by the risk level setting unit.

7. The peripheral monitoring device for a working machine according to claim 3, wherein:
in the generated image, the image generating means displays a warning image in superimposed form upon the obstacle having the highest contact risk level set by the risk level setting unit.

8. The peripheral monitoring device for a working machine according to claim 2, wherein:
if the type of obstacle having the highest contact risk level set by the risk level setting unit is a person, the image generating means depicts an image representing a person, in superimposed form upon the obstacle in the generated image.

9. The peripheral monitoring device for a working machine according to claim 3, wherein:
if the type of obstacle having the highest contact risk level set by the risk level setting unit is a person, the image generating means depicts an image representing a person, in superimposed form upon the obstacle in the generated image.

* * * * *